US010564959B2

(12) United States Patent
Kennedy et al.

(10) Patent No.: US 10,564,959 B2
(45) Date of Patent: Feb. 18, 2020

(54) SHARED SOFTWARE LIBRARIES FOR COMPUTING DEVICES

(71) Applicant: Google LLC, Mountain View, CA (US)

(72) Inventors: Todd Kennedy, San Jose, CA (US); Dianne Hackborn, Mountain View, CA (US); Agustin Fonts, Santa Clara, CA (US); Svetoslav Ganov, San Francisco, CA (US)

(73) Assignee: Google LLC, Mountain View, CA (US)

(*) Notice: Subject to any disclaimer, the term of this patent is extended or adjusted under 35 U.S.C. 154(b) by 40 days.

(21) Appl. No.: 15/643,410

(22) Filed: Jul. 6, 2017

(65) Prior Publication Data
US 2018/0267796 A1    Sep. 20, 2018

Related U.S. Application Data

(60) Provisional application No. 62/471,298, filed on Mar. 14, 2017.

(51) Int. Cl.
*G06F 9/44*         (2018.01)
*G06F 9/445*        (2018.01)
*G06F 8/71*         (2018.01)
*G06F 8/61*         (2018.01)

(52) U.S. Cl.
CPC .  *G06F 8/71* (2013.01); *G06F 8/61* (2013.01)

(58) Field of Classification Search
CPC .......... G06F 8/71; G06F 8/61–67; G06F 8/60; G06F 8/658; G06F 16/22; G06F 9/45558; G06F 8/70
See application file for complete search history.

(56) References Cited

U.S. PATENT DOCUMENTS 6,631,521 B1 * 10/2003 Curtis ...................... G06F 8/62
                                                 710/8
7,689,999 B2 *  3/2010 Garms ...................... G06F 8/71
                                                 718/104

(Continued)

OTHER PUBLICATIONS

Hajime Fujita, Versioning Architectures for Local and Global Memory, 2015, pp. 515-524 https://ieeexplore.ieee.org/document/7384334 (Year: 2015).*

(Continued)

*Primary Examiner* — Mongbao Nguyen
(74) *Attorney, Agent, or Firm* — McDonnell Boehnen Hulbert and Berghoff LLP

(57) ABSTRACT

Apparatus and methods related to stored software libraries are provided. A computing device can receive versioned-shared-library information for a first software library used by a software application, where the versioned-shared-library information can include an identifier. The computing device can determine whether the computing device stores a copy of the first software library identified in the versioned-shared-library information by the identifier. The computing device can send a request for one of a full executable and a stripped executable for the software application, where the full executable includes the first software library, and where the stripped executable excludes the first software library. In response to the request, the computing device can receive the full executable or the stripped executable for the software application.

22 Claims, 7 Drawing Sheets

(56) References Cited

U.S. PATENT DOCUMENTS

| | | | | |
|---|---|---|---|---|
| 8,099,572 | B1* | 1/2012 | Arora | G06F 13/28 |
| | | | | 707/640 |
| 8,997,077 | B1* | 3/2015 | Connolly | G06F 16/23 |
| | | | | 717/168 |
| 9,086,917 | B1* | 7/2015 | Fitzgerald | G06F 8/60 |
| 9,379,903 | B1* | 6/2016 | McAlister | H04L 41/042 |
| 2004/0123270 | A1 | 6/2004 | Zhuang et al. | |
| 2005/0055686 | A1* | 3/2005 | Buban | G06F 8/62 |
| | | | | 717/170 |
| 2007/0150886 | A1* | 6/2007 | Shapiro | G06F 8/61 |
| | | | | 717/174 |
| 2007/0168956 | A1* | 7/2007 | Moore | G06F 8/60 |
| | | | | 717/120 |
| 2011/0055823 | A1* | 3/2011 | Nichols | G06F 9/4451 |
| | | | | 717/174 |
| 2011/0113417 | A1* | 5/2011 | McCurdy | G06F 8/65 |
| | | | | 717/170 |
| 2011/0113424 | A1* | 5/2011 | Ewington | G06F 8/658 |
| | | | | 717/178 |
| 2012/0011501 | A1* | 1/2012 | Filali-Adib | G06F 9/45558 |
| | | | | 718/1 |
| 2012/0174124 | A1* | 7/2012 | Ward | G06F 8/71 |
| | | | | 719/331 |
| 2013/0067449 | A1* | 3/2013 | Sannidhanam | G06F 8/60 |
| | | | | 717/170 |
| 2013/0104113 | A1 | 4/2013 | Gupta et al. | |
| 2013/0247021 | A1* | 9/2013 | You | G06F 8/61 |
| | | | | 717/169 |
| 2014/0033188 | A1* | 1/2014 | Beavers | G06F 8/65 |
| | | | | 717/170 |
| 2014/0282608 | A1 | 9/2014 | Biancalana et al. | |
| 2015/0135170 | A1 | 5/2015 | Murray et al. | |
| 2015/0215375 | A1* | 7/2015 | Hundt | H04L 67/34 |
| | | | | 709/203 |
| 2015/0347173 | A1* | 12/2015 | Shen | G06F 9/5077 |
| | | | | 718/1 |
| 2015/0355899 | A1* | 12/2015 | Agarwal | G06F 8/658 |
| | | | | 717/170 |
| 2016/0026452 | A1* | 1/2016 | Dani | G06F 8/65 |
| | | | | 717/170 |
| 2016/0132311 | A1* | 5/2016 | Beckman | G06F 8/656 |
| | | | | 717/177 |
| 2016/0132343 | A1* | 5/2016 | Kajigaya | G06F 9/44521 |
| | | | | 719/331 |
| 2016/0224327 | A1* | 8/2016 | Angelotti | G06F 9/44521 |
| 2016/0335079 | A1* | 11/2016 | Tammam | G06F 8/656 |
| 2017/0075686 | A1* | 3/2017 | Ko | G06F 9/06 |
| 2017/0132000 | A1* | 5/2017 | Voigt | G06F 8/65 |
| 2017/0177325 | A1* | 6/2017 | Carranza | G06F 8/65 |
| 2017/0177333 | A1* | 6/2017 | Busayarat | G06F 8/71 |
| 2017/0230452 | A1* | 8/2017 | Godowski | G06F 16/178 |
| 2017/0242687 | A1* | 8/2017 | Saraswati | G06F 8/65 |
| 2018/0136920 | A1* | 5/2018 | Devagupthapu | G06F 8/61 |
| 2018/0150287 | A1* | 5/2018 | Del Sordo | G06F 8/62 |

OTHER PUBLICATIONS

Emily R. Jacobson, Labeling Library Functions in Stripped Binaries, 2011, pp. 1-8 ftp://ftp.cs.wisc.edu/paradyn/papers/Jacobson11Unstrip.pdf (Year: 2011).*

International Searching Authority, International Search Report and Written Opinion for PCT Pat. App. No. PCT/US2017/057272 dated Feb. 12, 2018.

D. Das, "Framwork vs Library (Cocoa, iOS)", Feb. 25, 2015, available via the Internet at www.knowstack.com/framework-vs-library-cocoa-ios/ (last visited Jul. 19, 2017).

D. Drysdale, "Beginner's Guide to Linkers", Mar. 2009, available via the Internet at www.lurklurk.org/linkers/linkers.html (last visited Feb. 2, 2017).

Duskwuff et al., "Shared Libraries: Windows vs Linux method", May 24, 2013, available via the Internet at stackoverflow.com/questions/16737347/shared-libraries-windows-vs-linux-method (last visited Feb. 2, 2017).

Microsoft Corporation, "What is a DLL?", Apr. 26, 2017, available via the Internet at support.microsoft.com/en-us/help/815065/what-is-a-dll (last visited Jul. 19, 2017).

Nos et al., "How to do versioning of a shared library in Linux?", Sep. 26, 2011, available via the Internet at stackoverflow.com/questions/7553184/how-to-do-versioning-of-a-shared-library-in-linux (last visited Feb. 2, 2017).

D. E. Petteno, "Library Versioning", Section 3.4 of "Autotools Mythbuster", Feb. 5, 2013, available via the Internet at autotools.io/libtool/version.html (last visited Feb. 2, 2017).

P. Seebach, "Dissecting Shared Libraries", Jan. 11, 2005, available via the Internet at www.ibm.com/developerworks/library/l-shlibs/index.html (last visited Feb. 2, 2017).

Venki, "Working with Shared Libraries | Set 1", Jun. 14, 2013, available via the Internet at web.archive.org/web/20130703052747/http://www.geeksforgeeks.org:80/working-with-shared-libraries-set-1/ (last visited Jul. 19, 2017).

Venki, "Working with Shared Libraries | Set 2", Jun. 25, 2013, available via the Internet at web.archive.org/web/20130703052830/http://www.geeksforgeeks.org:80/working-with-shared-libraries-set-2/ (last visited Jul. 19, 2017).

Wikimedia Foundation, "DLL Hell", Jan. 26, 2017, available via the Internet at en.wikipedia.org/w/index.php?title=DLL_Hell&oldid=762036823 (last visited Feb. 2, 2017).

* cited by examiner

SHARED SOFTWARE LIBRARIES FOR COMPUTING DEVICES

CROSS-REFERENCE TO RELATED APPLICATIONS

This patent application claims priority to U.S. Provisional Patent Application No. 62/471,298, filed on Mar. 14, 2017, entitled "Shared Software Libraries for Computing Devices", the contents of which are entirely incorporated herein by reference for all purposes.

BACKGROUND

Many computing devices, including mobile computing devices, can run application software to perform various functions, such as communication-related functions, data manipulation functions, image generation and/or presentation functions, audio generation and/or presentation function, and other functions. The application software can be downloaded, or communicated to a computing device from a server or other computing device. In some cases, the application software can be downloaded as part of a software package. The software package can include application software and instructions for installing the application software. For example, the software package can be executable to carry out the instructions to install the application software.

Some software application can rely upon functionality embodied in one or more software libraries. Example software libraries include software with input/output functionality, graphical user interface functionality, operating system interface functionality, memory management functionality, mathematical functionality, and other functionality. For example, the software application can be stored in an executable file that includes the software libraries used by the application.

SUMMARY

In one aspect, a method is provided. A computing device receives versioned-shared-library information for at least a first software library used by a software application, where the versioned-shared-library information for the first software library includes an identifier of the first software library. The computing device determines whether the computing device stores a copy of the first software library identified in the versioned-shared-library information by the identifier of the first software library. Based on whether the computing device stores the copy of the first software library, the computing device sends a request for one of a full executable and a stripped executable for the software application, where the full executable includes at least the first software library, and where the stripped executable excludes the first software library. In response to the request, the computing device receives the full executable or the stripped executable for the software application for storing on the computing device.

In another aspect, a computing device is provided. The computing device includes one or more processors; and data storage including at least computer-executable instructions stored thereon that, when executed by the one or more processors, cause the computing device to perform functions. The functions include: receiving versioned-shared-library information for at least a first software library used by a software application, where the versioned-shared-library information for the first software library includes an identifier of the first software library; determining whether the computing device stores a copy of the first software library identified in the versioned-shared-library information by the identifier of the first software library; based on whether the computing device stores the copy of the first software library, sending a request for one of a full executable and a stripped executable for the software application, where the full executable includes the first software library, and where the stripped executable excludes the first software library; and in response to the request, receiving the full executable or the stripped executable for the software application for storing on the computing device.

In another aspect, a computer readable medium is provided. The computer readable medium has stored thereon instructions, that when executed by one or more processors of a computing device, cause the computing device to perform functions. The functions include: receiving versioned-shared-library information for at least a first software library used by a software application, where the versioned-shared-library information for the first software library includes an identifier of the first software library; determining whether the computing device stores a copy of the first software library identified in the versioned-shared-library information by the identifier of the first software library; based on whether the computing device stores the copy of the first software library, sending a request for one of a full executable and a stripped executable for the software application, where the full executable includes the first software library, and where the stripped executable excludes the first software library; and in response to the request, receiving the full executable or the stripped executable for the software application for storing on the computing device.

In another aspect, an apparatus is provided. The apparatus includes: means for receiving versioned-shared-library information for at least a first software library used by a software application, where the versioned-shared-library information for the first software library includes an identifier of the first software library; means for determining whether the computing device stores a copy of the first software library identified in the versioned-shared-library information by the identifier of the first software library; means for sending a request for one of a full executable and a stripped executable for the software application based on whether the computing device stores the copy of the first software library, where the full executable includes the first software library, and where the stripped executable excludes the first software library; and means for receiving the full executable or the stripped executable for the software application for storing on the computing device in response to the request.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
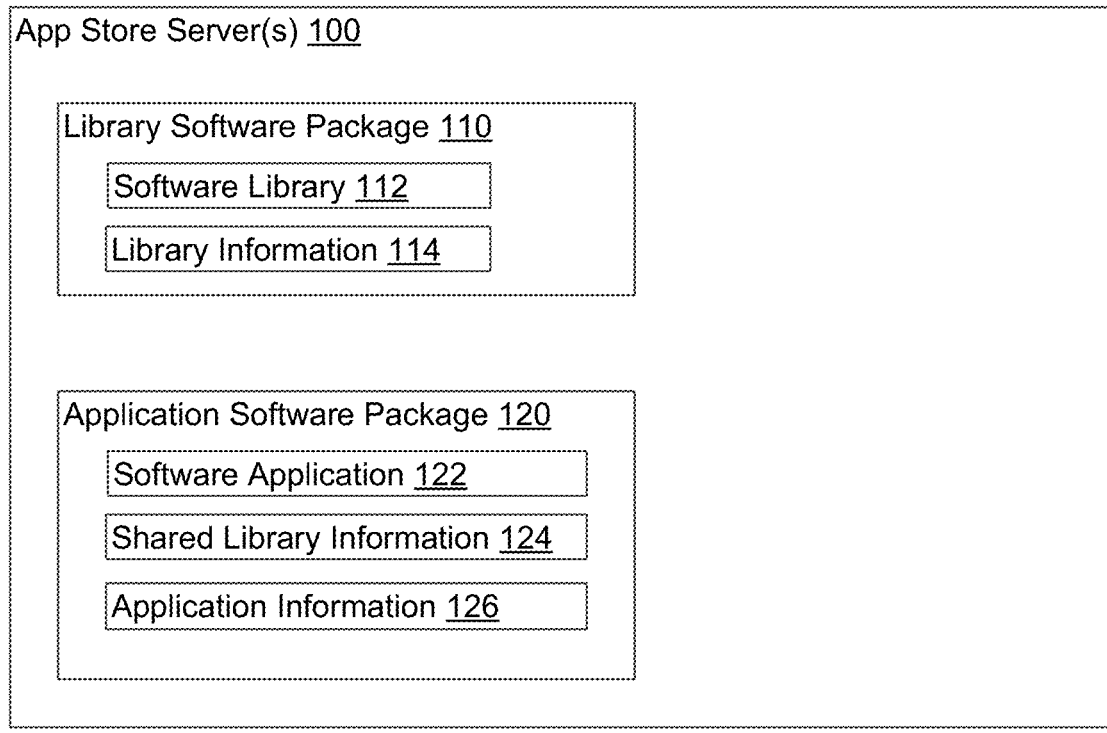
FIG. 1 shows software packages stored by an application store, in accordance with an example embodiment.

Techniques and Apparatus for Sharing Software Libraries

Software applications can be written as source code in one or more computer languages. In some cases, the source code for a software application can be compiled, and the compiled source code can be stored in an executable file, and the compiled code in the executable file can be executed by a computing device to carry out the various functions of the software application. Some of these functions can be stored in one or more software libraries. Then, as part of creating the executable file for the software application, the software library/libraries can be "linked in" with the compiled instructions of the source code. These software libraries can be statically linked; i.e., the software libraries are included in the executable file. Note that the terms "library" and "executable" respectively refer to a software library and an executable file throughout this specification, unless otherwise made clear by context.

However, if several applications use a common library, static linking of the common library can create several copies of the common library, and waste storage used to hold copies of the same common library. In one study related to a sample of more than 10,000,000 installed software applications, mobile computing device applications were found to use about 1 megabyte (MB) of storage per application to store libraries. Many of these libraries were used by multiple applications, where the most commonly used library was used by over 90% of sampled installed applications, and where at least five libraries were used by at least 10% of the sampled installed software applications. Further, the size of libraries can grow over time; e.g., the study also indicated that library sizes grew by about 50% over three years and so mobile computing device applications may use more than 1.5 MB (or more) of storage per application to store libraries in a few years. By one estimate, if three or more applications share a common library that is stored once on a computing device, an amount of storage used to store the three or more applications sharing one stored copy of the common library is less than an amount of storage used to store the three or more applications each having the common library linked in. Thus, even a relatively low amount of library sharing—that is, sharing of a library between at least three applications—can save storage space and those savings can grow over time.

Another technique to link libraries is to dynamically link the libraries; that is, to load the library into memory at run time; that is, the executable instructions corresponding to the source code of the software application are loaded into memory and then libraries are loaded into memory. If a library has already been loaded into memory (e.g., another application is using the library), one or more memory references to the already-loaded library can be resolved or refer to memory addresses of the already-loaded library. Then, if only one copy of a library is stored on a computing device and then the library is dynamically loaded, storage space can be saved.

But, dynamic loading can lead to difficulties as libraries evolve. Typically, dynamic loading of a named library involves loading at least part of the named library at run time. In some cases, the library can be "backward compatible"; that is, a newer version of the library supports all (or at least most) of the functionality of one or more previous versions of the library. Maintaining backward compatibility can be difficult as the library evolves, as restructured and/or new features may change previous functionality. These changes may cause faults in a previously-working software application that relied on functionality as implemented in an earlier version of the library, if the library is not truly backward compatible.

Use of a particular version of a library can be guaranteed if an application is built using a statically linked library, as a developer or other author of the software application can generate an executable that includes the particular version of the library. As indicated above, static linking of libraries can give a developer of a software application control over library compatibility at a cost of (potentially) wasted library storage space.

Herein are disclosed techniques and apparatus for storing, accessing, loading/using, and managing versioned shared libraries. These techniques enable a software developer to specify one and only one version of a shared library for dynamic loading and other purposes, even when several versions of the shared library are available. That is, the computing device can emulate a statically linked library using a shared library by: (a) ensuring one or more versions of a shared library are installed on a computing device and then (b) allowing an application to specify exactly which version of a shared library is to be dynamically linked to the application at runtime.

Using shared libraries that are dynamically loaded reduces the likelihood that multiple copies of the same version of a library are stored on the computing device, thus saving storage. Further, using shared libraries can reduce executable file sizes as executables using shared libraries need not include copies of those shared libraries. Reducing executable file sizes can shrink the size of corresponding software packages, making application installation faster by enabling downloading of smaller software packages and taking less time to allocate and store the application upon downloading. Additionally, a developer can specify which version of a library is to be used to maintain control over library compatibility. Allowing specification of a particular version of a shared library can allow a developer to design their application as they have been doing to date and with the confidence that there will be no compatibility problems with the library. Also, developers of upgraded library software can be less concerned about backward compatibility, as long as older versions of a shared library remain available.

In some environments, one or more "application stores", or distribution platforms for software applications, can store software applications and one or more versions of one or more libraries used by the software applications, including versioned shared libraries which are libraries specified in part by version information, such as a version number. Then, the application store can provide software applications and related libraries to computing devices upon request.

An application store can produce and/or provide multiple software packages; e.g., a first package that has a stripped executable for an application A and information specifying use of one or more shared libraries where the stripped executable excludes the one or more shared libraries, and a second package that includes a full executable for application A that includes the shared libraries. Prior to downloading the first software package by a destination device, the destination device and/or one or more other computing devices can use the shared-library information to determine whether the shared libraries are either missing from or already stored on the destination device. Once the destination device stores copies of all the shared libraries listed in the shared-library information, the destination device can download the first software package. The second package can be provided to the destination device when the use of one or more shared libraries is not feasible. For example, it is possible that not all of the devices that download and install application A also support shared libraries; in those cases, such devices can download and install the second package to utilize the full executable for application A.

In some examples, a partially-full executable can be utilized. The partially-full executable can share one or more software libraries and can include one or more other software libraries. For example, suppose application A_HYBRID depended upon two libraries: library L_HY1, version V.1.1, and library L_HY2, version V.1.1. Then, application A_HYBRID could be associated with least four possible software packages: (1) a full software package with a full executable for A_HYBRID, (2) a stripped software package with a stripped executable for A_HYBRID that included shared library information for both libraries L_HY1, version V.1.1, and L_HY2, version V.1.1, (3) a first partially-full software package with a partially-full executable for A_HYBRID that incorporated a copy of library L_HY1, version V.1.1 and shared library information for library L_HY2, version V.1.1, and (4) a second partially-full software package with a partially-full executable for A_HYBRID that incorporated a copy of library L_HY2, version V.1.1 and shared library information for library L_HY1, version V.1.1. In this example, further suppose that library L_HY2, version V.1.1 was no longer supported as a shared library but library L_HY1, while version V.1.1 is still supported as a shared library. Then, the second partially-full software package could be made available for downloading rather than either the stripped software package or the first partially-full software package. Other examples of partially-full executables are possible as well.

To generate a software package for an application that uses shared libraries, a developer can provide one or more executables for the application and shared-library information about the shared libraries. The shared-library information can be in the form of shared-library metadata, such as tags, and/or other data. The shared-library information can be used to "build" or generate an executable for a software application and to ensure that an executable for an application can be run; i.e., ensuring a copy of a specified shared library is available before the executable is first executed. For example, the shared-library information can include information about the exact shared library including a library name, a library version number, and/or other data about the exact shared library; e.g., a hash value specific to the exact shared library.

One or more application programming interfaces (APIs) can enable the application store and/or other entities, such as an application store client executing on a destination device, to determine whether shared libraries and/or particular versions of shared libraries are either missing from or already stored on a computing device, such as a destination device downloading a software package. As indicated above, shared-library information of the software package can include versioning information. Then, the API can be used to get information for determining whether a specific version of a shared library specified in shared-library information is either missing from or already stored on the destination device. In some examples, when one or more of the shared libraries are missing from the destination device, the destination device can obtain the missing shared libraries from the application store; e.g., during the application downloading process.

Software utilities can assist in generating and distributing software packages with shared libraries. For example, an upload software utility can take as an input a full software package having a full executable, where the full executable includes both a compiled copy of the application software and copies of any shared libraries used by the application software. When executed, the upload software utility can generate a corresponding stripped software package that includes a stripped executable and shared-library information, where the stripped executable can be a version of the full executable without the copies of the shared libraries, and the shared-library information can provide information about the names and versions of shared libraries that were removed to create the stripped executable. In some cases, the full software package can include shared-library information about one or more potentially shared libraries used by the application software. Then, the upload software utility can determine if the shared-library information is correct for each potentially shared library (i.e., make sure the version of a library is actually available as a shared library). If the information about a shared library is correct, the upload software utility can strip the shared library from the executable and provide shared-library information about the stripped shared library as part of the stripped software package. In some examples, software compilation/build tools that may differ from the upload software utility can be used to generate stripped executables, stripped software packages, shared-library information, full executables, and full software packages. For example, these software compilation/build tools can be used by application developers to generate executables, packages, and shared-library information independently of uploading (or downloading) information The upload software utility can be associated with an application store, and so a developer can upload the full software package to the application store. As part of an upload process, the application store can invoke the upload software utility with the uploaded full software package as input to generate a corresponding one or more stripped software packages. In some examples, the shared-library information can include build information to create a single (binary) file with the shared-library information, the build information, software, resources, and other dependency information (e.g., information about which software components rely upon, or depend from other software components) for building the software application. Then, the (binary) file can be uploaded to the application store for analysis, processing, and generation of software packages by the upload software utility. In other examples, the upload process can include the application store invoking the upload software utility with an uploaded stripped software package with a stripped executable and shared-library information as inputs to generate a corresponding full software package that includes a full executable, where the full executable includes the stripped executable and copies of libraries referred to in the shared-library information.

After the upload software utility has been executed, the application store can then make the full and/or stripped software packages available for subsequent download and installation. In some examples, the upload software utility can generate one or more full and/or stripped software packages that have been tailored for use by a specific make and/or model of computing device; e.g., tailored to a screen size, available memory, processors, and/or other features of the computing device. The upload software utility can simplify software distribution for application software, as developers need not build multiple versions of the same application; rather, the software utility can generate multiple, tailored software packages for distribution of the software application.

A download software utility can receive requests for application software and deliver a software package suitable for use by a requesting device. In some examples, the download software utility can be executed on an application store server directly; while in other examples, the download software utility can be part of an application store client and/or other software executed on a requesting device that sends requests application software.

The download software utility can communicate with the requesting device to provide either a full software package or a stripped software package, depending on whether or not the requesting device can suppose the use of shared libraries. The download software utility can download and either install a full software package if the requesting device does not support the use of shared libraries or install a stripped software package if the requesting device does support the use of shared libraries.

If a stripped software package can be installed, the download software utility can verify that the requesting device has copies of the versions of shared libraries that can be used in a stripped software package. To perform this verification, the download software utility can examine the shared-library information in the stripped software package to see if the software application uses any shared libraries. Then, the related software utility can use version matching to compare any shared libraries used by the stripped software package to a list of available shared libraries. If a version match for a shared library is detected, the download software utility can, as needed: communicate with the version of the software utility executing on the requesting device to determine whether the matching shared library is already resident on the shared device; and generating a stripped software package that refers to the matching shared library by at least stripping out the shared library from a full software package.

If the requesting device is missing one or more of the matched shared libraries, those missing shared libraries can be downloaded from the application store during installation of the stripped software package. If a software package has to be "patched" or updated to fix bugs and/or otherwise improve the software application and/or software package, patching software can support patches for both stripped and full software packages, in case the patch differs based on the type of software package and/or contents thereof; e.g., whether or not a library being patched is present in the software package. In some cases, the software utilities can use the list of available shared libraries to verify correctness of software packages. For example, if a stripped software package includes a reference to a shared library that is not on the list of available shared libraries, the stripped software package can be updated to remove the reference to the shared library that is not on the list of available shared libraries.

Also, an application store can limit or otherwise control the number of versions of libraries supported at any one time. Limiting a number of versions available for a shared library can be beneficial as having non-popular libraries and/or too many versions available for popular libraries can take an excessive amount of storage for a proliferation of versions of shared libraries.

To support the use of shared libraries, a computing device, such as a mobile computing device, can include data storage for the shared libraries and library-management software to manage the stored shared libraries; e.g., software to install, remove, and maintain information about stored shared libraries as well as an API and/or other software to enable access to the information about the shared libraries stored on the computing device. The library-management software can include software to force removal and/or garbage collect shared libraries; that is, remove shared libraries that have not been utilized during a period of time and/or are not referred to as shared libraries by at least a threshold number of applications (e.g., one, two). The number of applications that refer to a particular shared library SL1, also termed a "reference count" for shared library SL1, can be initialized to zero, incremented when a software application is installed that refers to SL1, and decremented when a software application that refers to SL1 is uninstalled. The library-management software can include software to replace a stripped executable for a software application with a corresponding full executable that includes a copy of a shared library, so that the shared library can be removed. For example, if only one application A1 stored on computing device CD1 refers to a particular version V1 of shared library SL1, then the library-management software can replace stripped executable SE1 for A1 with a corresponding full executable F1 for A1 that includes a copy of version V1 of shared library SL1. The library-management software can then delete the stored copy of version V1 of shared library SL1. In some cases, the library-management software can generate the full executable F1 from stripped executable SE1 and a copy of version V1 of shared library V1; after generating the full executable F1, the library-management software can replace stripped executable SE1 for A1 with full executable F1 for A1

Also, reference counts can be used to determine whether a stripped executable or a full executable should be downloaded. For example, if a reference count for a shared library is less than a threshold value, indicating that at most a few applications would use or are likely to use the shared library, a full executable can be downloaded instead of a shared library. This indication of likelihood of use of a shared library can be based on additional criteria than the corresponding reference count. Such criteria can include but are not limited to, which applications are currently on the device, data from other devices about usage of the shared library; e.g., based on what applications are being used by other devices, and/or data about a number of downloads of a shared library package including the shared library. Thus, based on the reference count for a shared library and/or the additional criteria, a device can determine whether to request a software package for an application with a stripped executable or a corresponding software package for the application having the corresponding full executable.

In some examples, one or more full executables can be replaced with corresponding stripped executables and one or more shared libraries. Continuing the example above, after full executable F1 for A1 that includes a copy of version V1 of shared library SL1 and a stored copy of version V1 of shared library SL1 have been removed from CD1, suppose that two executables F2 and F3 are downloaded and installed on CD1, each of which are stripped executables that depend upon (i.e., utilize functionality of) version V1 of shared library SL1. Then, after shared library SL1 has been installed on CD1, the library-management software can replace full executable F1 for A1 by a copy of stripped executable SE1 for A1.

In some examples, a library can be split, or partially included, for a stripped executable. For example, suppose a shared library SL_PARTIAL includes software and related resources for ten distinct functions F1, F2 . . . F10, and an application A2 only uses software and related resources for one function F2. Then, if A2 is executed, one or more segments/portions of SL_PARTIAL that include software and related resources for function F2 can be loaded at runtime. Then, a stripped executable SE2 for A2 may only have relevant software and resources loaded from the library at run time; e.g., software and resources for function F2. In contrast, a full executable for A2 would have all of SL_PARTIAL loaded at run time. This difference can be mitigated by supporting resource splits of a static shared lib.

A shared-library user interface, such as a graphical user interface (GUI) of a computing device, can include functionality related to providing information about and controls for shared libraries. For example, a GUI and/or other user interface on a computing device "CD1" can provide a shared-library display listing shared libraries currently installed on CD1. The shared-library display can include related data about a shared library such as, but not limited to: library version number, times of library creation and/or installation, library size, information about applications that utilize the shared library, information about functionality provided by the shared library, and information about author(s) and/or source(s) of the shared library. The shared-library user interface can provide one or more controls; e.g., icons, buttons, menus, to enable presentation of the some or all of the related data about a shared library mentioned immediately above. In some cases, a storage settings GUI or other GUI provided by the computing device can include the user interface for shared libraries.

A computing device can have testing software for testing software applications with shared libraries. For example, the testing software can list, download, install, and/or uninstall a specific version of one or more shared libraries. The testing software can have an interface that provides dump commands and platform logging can refer to a shared library by a stored-shared-library name. In some examples, the testing software can be accessible via the shared-library user interface.

During installation of a stripped software package onto a computing device "CD", a query can be used to determine whether CD stores one or more versions of one or more shared libraries. In some cases, the query can be restricted to specific versions of a shared library; i.e., the query can be restricted to versions of shared libraries referred to by the stripped software package. For example, suppose stripped software package P depends on library L, version v1 and that CD stores two versions of library L—versions v1 and v2. Then, a query run on behalf of stripped software package P for library L would return that version v1 of library L is stored on CD, but not return that version v2 of library L is also stored on CD. In these examples, queries run on behalf of software packages that do not refer to any shared libraries will not return any information about libraries stored on CD. In other cases, the above-mentioned download software utility can perform some or all of the functionality needed to execute queries for determining whether CD stores one or more versions of one or more shared libraries that are listed in shared-library information in a software package; e.g., a stripped software package.

A library may or may not be eligible to be treated as a shared library; for example, due to limits on: testing a particular library, storage for shared libraries, a number of shared libraries, and/or a number of versions available for a shared library. For a library that is eligible to a shared library, the shared library can be specified by identifier and version, so the eligible library can have a name or other identifier and include version information. In some examples, the library can be associated with verification information, such as one or more hash sums, cryptographic hash sums, and/or other information, for verifying data integrity of the library. In particular of these examples, the verification information can act as an identifier of the library; i.e., instead of or along with a name and/or version of the library. Also, the eligible library can be updated to include archival and other information used when building software applications to enable the applications to refer to the eligible library as a shared library.

In determining which versions of a library may be made eligible for use as shared libraries, versions of the library that are likely to be stable and not break software applications can be prioritized over versions that are less likely to be stable. For example, historical data about a particular library SL2 can indicate that initial versions V1.0, V2.0 . . . of SL2 may not be stable. So, if a new version V3.0 of SL2 is being considered for eligibility, the historical data suggests that earlier point releases of V3.0 of SL2 such as V3.0, V3.0.1, and V3.0.2 may not be eligible for use as shared libraries, but a version based on a later point release, such as V3.0.3 of SL2, may be eligible. Continuing this example, applications built against versions V3.0, V3.0.1, and V3.0.2 of SL2 can be packaged as full software packages with a copy of SL2 statically linked into application executables, while applications built against version V3.0.3 of SL2 can be packaged either as full software packages with a copy of SL2, V3.0.3 or as stripped software packages that use shared library SL2, version V3.0.3.

Applications built against V3.0.3 can be packaged as a stripped software package, where application executables do not include a linked-in copy of SL2, V3.0.3. In some examples, a software application can have to specifically indicate the use of a shared library when building a software application. That is, to build a stripped software package, a developer may be required to explicitly indicate the use of stripped software application packages at build time.

Later versions of a library may be stable but not eligible for sharing. For example, such a stable version of the library may be relatively-short lived, have a relatively small number of fixes, and/or may be limited based on a total number of supported versions of the library. Proceeding with the example above, suppose SL2 has later point releases V3.0.4 and V3.0.5; both of which are deemed to be stable, but only V3.0.5 is eligible for use as a shared library. Then, applications built against version V3.0.4 of SL2 can be packaged as full software packages with a copy of SL2, V3.0.4 statically linked into application executables, while applications built against version V3.0.5 of SL2 can be packaged either as full software packages with a copy of SL2, V3.0.5 or as stripped software packages that use shared library SL2, version V3.0.5. In some embodiments, applications built against version V3.0.3 of SL2 as a shared library will continue to use SL2, version V.3.0.3 as a shared library. In other embodiments, applications built against version V3.0.3 of SL2 as a shared library will be "upgraded" to use the latest version of SL2; that is, version V3.0.5 of SL2, as a shared library.

In some of these other embodiments, an application can decide whether to use a particular version of a shared library or to use the latest version of the shared library. More particularly, an application that uses a shared library can declare a dependency on one or more versions of the shared library. The dependency can be specified using one of the following dependency types:

Exact Dependency Type—asking for version 1.2.3 of a shared library at build time, and getting exactly version 1.2.3 of the shared at run time Minimum Dependency Type—asking for version 1.2.3 of a shared library at build time, and getting 1.2.3 or any later version at runtime; i.e., get the latest version of the shared library that is at least version 1.2.3

Maximum Dependency Type—asking for version 1.3.2 of a shared library at build time, and getting 1.3.2 or any earlier version at runtime; i.e., get the latest version of the shared library that is no later than version 1.3.2. The combination of minimum and maximum dependency types allows specification of a window of library versions; e.g., a library version no earlier than version 1.2.3 as specified by the minimum dependency type and no later than version 1.3.2 as specified by the maximum dependency type.

Template Dependency Type—using a "*" and other characters to specify a template of a version number for the shared library, where "*" matches a string of zero or more characters. For example, using a template to ask for version "1.2.*" of a shared library at build time, and getting any of version 1.2.* of the shared library (e.g., 1.2.0, 1.2.1, 1.2.1.1, 1.2.2, etc.) at runtime but not a shared library that does not match the template (e.g., 1.3, 1.3.2, 2.0, etc.) Other dependency types are possible as well.

In some examples, a shared library can depend on one or more other libraries, including one or more shared libraries. In these examples, dependencies between libraries can be declared. More specifically, if shared library L1, version v1 depends on shared library L2, version v1.7.13a or later, a dependency between L1 and L2 can be declared, where that dependency declaration includes information that version v1 of library L1 depends from library L2 with a minimum dependency type of version v1.7.13a. Other examples of dependencies between libraries are possible as well.

A static shared library can be installed (or uninstalled) on a computing device using a software package in the same or similar manner as used to install (or uninstall) software applications. Typically, only one version of a software application is installed at one time; in contrast, multiple versions of shared libraries versions can be installed at the same time. Uninstallation of a shared library can include specification of one or more versions of the shared library to be uninstalled. An example specification of an object "PackageInstaller" for uninstalling a shared library is:

public void PackageInstaller#uninstall(@NonNull VersionedPackage versionedPackage, @NonNull IntentSender statusReceiver);

Installation of shared libraries can include determining a stored-shared-library name that can be a name of one or more packages, files, directories, folders, and/or other storage entities used to store a shared library on a computing device. The stored-shared-library name can be a unique name that is based on the name of the library and/or the version of the library. For example, if the library name is "foo.bar.baz", then the stored-shared-library name can be "foo.bar.baz" or a related name; e.g., "foo_bar_baz" replacing the periods in the library name with underscores. As another example, if the library name is "foo.bar.baz" and the library version is "V1", then the stored-shared-library name can be "foo.bar.baz_V1" or a related name. As shared libraries can be uniquely identified by the name of the library and the version of the library, names generated in this fashion are unique.

In some cases, stored-shared-library names can be "synthetic" names used internally by the operating system and/or other system software of a computing device, but otherwise not divulged. In other cases, stored-shared-library names can be used both internally and externally; that is, a stored-shared-library can be made visible outside of the operating system and/or other system software. In still other cases, names of shared libraries used by the shared-library user interface and/or testing software can be the stored-shared-library names that are based on library names and/or library versions based above; e.g., a testing/debugging interface that supports dump commands and platform logging can refer to a shared library by a stored-shared-library name.

The use of different stored-shared-library names for a shared library can simplify identification of a particular version of the library; e.g., inspecting the stored-shared-library names "foo.bar.baz_V1" and "foo.bar.baz_V2" allows for identification of "foo.bar.baz_V1" as being a version V1 of the library and "foo.bar.baz_V2" as being a version V2 of the library. In some examples, operations on stored libraries can depend on exact matches of library information. One such operation is updating a stored shared library, which can occur only if both a library name and a library version are exactly matched between a name and a version of a stored shared library and a name and a version of an update that is (supposedly) for the same shared library. Without such matching, a shared library could be improperly updated.

One or more APIs can be used to obtain information about a library stored on a computing device. For example, an API can indicate whether a library is built into a software application (e.g., is part of a full application), dynamically loadable, or shared. As another example, the API (and/or another API) can be used to obtain information about where to store a shared library on the computing device. A further example is a platform API for querying information for a specific version of a package and uninstalling a package—an example platform API is illustrated in Table 1 below:

TABLE 1

```
/**
 * Retrieve overall information about an application package that is installed on the system
 * This method can be used for retrieving information about packages for which multiple
 * versions can be installed at one time. Currently, packages hosting static shared
 * libraries can have multiple installed versions.
 *
 * @param versionedPackage The versioned packages for which to query.
 * @param flags Additional option flags. Use any combination of
 * {@link #GET_ACTIVITIES}, {@link #GET_CONFIGURATIONS},
 * {@link #GET_GIDS}, {@link #GET_INSTRUMENTATION},
```

TABLE 1-continued

```
* {@link #GET_INTENT_FILTERS}, {@link #GET_META_DATA},
* {@link #GET_PERMISSIONS}, {@link #GET_PROVIDERS},
* {@link #GET_RECEIVERS}, {@link #GET_SERVICES},
* {@link #GET_SHARED_LIBRARY_FILES}, {@link #GET_SIGNATURES},
* {@link #GET_URI_PERMISSION_PATTERNS},
* {@link #GET_UNINSTALLED_PACKAGES},
* {@link #MATCH_DISABLED_COMPONENTS}
* {@link #MATCH_DISABLED_UNTIL_USED_COMPONENTS},
* {@link #MATCH_UNINSTALLED_PACKAGES}
* to modify the data returned.
*
* @return A PackageInfo object containing information about the
* package. If flag {@code MATCH_UNINSTALLED_PACKAGES} is set and if the
* package is not found in the list of installed applications, the package information is retrieved
* from the list of uninstalled applications (which includes installed applications as well as
* applications with data directory i.e. applications which had been deleted with
* {@code DONT_DELETE_DATA} flag set).
* @throws NameNotFoundException if a package with the given name cannot be
* found on the system.
* @see #GET_ACTIVITIES
* @see #GET_CONFIGURATIONS
* @see #GET_GIDS
* @see #GET_INSTRUMENTATION
* @see #GET_INTENT_FILTERS
* @see #GET_META_DATA
* @see #GET_PERMISSIONS
* @see #GET_PROVIDERS
* @see #GET_RECEIVERS
* @see #GET_SERVICES
* @see #GET_SHARED_LIBRARY_FILES
* @see #GET_SIGNATURES
* @see #GET_URI_PERMISSION_PATTERNS
* @see #MATCH_DISABLED_COMPONENTS
* @see #MATCH_DISABLED_UNTIL_USED_COMPONENTS
* @see #MATCH_UNINSTALLED_PACKAGES
*/
public PackageInfo PackageManager#getPackageInfo(VersionedPackage versionedPackage,
    @PackageInfoFlags int flags) throws NameNotFoundException;
/**
* Uninstall the given package with a specific version code, removing it completely from
* the device. This method is available to the current "installer of record" for the package
* If the version code of the package does not match the one passed in the versioned package
* argument this method is a no-op.
* Use {@link PackageManager#VERSION_CODE_HIGHEST} to uninstall the latest version
* of the package.
*
* @param versionedPackage The versioned package to uninstall.
* @param statusReceiver Where to deliver the result.
*/
@RequiresPermission(anyOf = {
  Manifest.permission.DELETE_PACKAGES,
  Manifest.permission.REQUEST_DELETE_PACKAGES})
public void PackageInstaller#uninstall(@NonNull VersionedPackage versionedPackage,
    @NonNull IntentSender statusReceiver);
/**
* There is a new class VersionedPackage to encapsulate a package and its version code since
* we now support multiple versions of the same package being installed at the same time.
*
*/
public final class VersionedPackage implements Parcelable {
  /**
  * Creates a new instance. Use {@linkPackageManager#VERSION_CODE_HIGHEST}
  * to refer to the highest version code of this package.
  * @param packageName The package name.
  * @param versionCode The version code.
  */
  public VersionedPackage(@NonNull String packageName,
    @VersionCode int versionCode);
  /**
  * Gets the package name.
  *
  * @return The package name.
  */
  public @NonNull String getPackageName( );
  /**
  * Gets the version code.
  *
  * @return The version code.
  */
  public @VersionCode long getVersionCode( );
```

TABLE 1-continued

```
}
/**
* This class provides information for a shared library. There are three types of shared libraries:
* builtin - non-updatable part of the operating system;
* dynamic - updatable backwards-compatible dynamically linked;
* static - updatable non backwards-compatible emulating static linking.
*/
public final class SharedLibraryInfo implements Parcelable {
  /**
   * Constant for referring to an undefined version.
   */
  public static final int VERSION_UNDEFINED = -1;
  /**
   * Gets the library name.
   *
   * @return The name.
   */
  public String getName( );
  /**
   * Gets the version of the library. For {@link #isStatic( )} static} libraries
   * this is the declared version and for {@link #isDynamic( )} dynamic} and
   * {@link #isBuiltin( )} builtin} it is {@link #VERSION_UNDEFINED} as these
   * are not versioned.
   *
   * @return The version.
   */
  public @IntRange(from = -1) int getVersion( );
  /**
   * @return whether this library is builtin = part of the operating system. Builtin libraries
   * cannot be updated or uninstalled.
   */
  public boolean isBuiltin( );
  /**
   * @return whether this library is dynamic which means that it is backwards-compatible,
   * can be updated, and updates can be uninstalled. Clients link against the latest version
   * of the library.
   */
  public boolean isDynamic( );
  /**
   * @return whether this library is dynamic which means that it is not backwards-compatible,
   * can be updated and updates can be uninstalled. Clients link against a specific version
   * of the library.
   */
  public boolean isStatic( );
  /**
   * Gets the package that declares the library.
   *
   * @return The package declaring the library.
   */
  public @NonNull VersionedPackage getDeclaringPackage( );
  /**
   * Gets the packages that depend on the library.
   *
   * @return The dependent packages.
   */
  public @NonNull List<VersionedPackage> getDependentPackages( );
}
/**
 *
* An API for getting information about the shared libraries on the device:
 */
/**
* Get a list of shared libraries on the device.
*
* @param flags To filter the libraries to return.
* @return The shared library list.
*
* @see #MATCH_FACTORY_ONLY
* @see #MATCH_KNOWN_PACKAGES
* @see #MATCH_ANY_USER
* @see #MATCH_UNINSTALLED_PACKAGES
*/
public abstract @NonNull List<SharedLibraryInfo> getSharedLibraries(
    @InstallFlags int flags);
/**
  * There is a new package installer constant to refer to the highest version code of an app
  * which is the only one present for normal packages and the highest for packages
```

TABLE 1-continued

* providing a static library.
*/
public static final int PackageManager#VERSION_CODE_HIGHEST = -1;

The shared libraries can be stored in one or more repositories/partitions of data storage of a computing device. Each repository/partition can store one or more different versions of one or more different libraries. In some cases, the library-management software on the computing device can determine how many versions of a particular library are to be stored. For example, the library-management software can maintain a sliding window of X versions (X>0) of a shared library. Versions of the shared library outside of the sliding window can be deleted or marked for static linking into executables. Use of the sliding window to only store the X most recent versions of a shared library can provide an incentive to developers to utilize one of the X most recent versions of the shared library with their application software.

In some examples, uninstallation/removal of an application can cause removal of shared libraries utilized by the now-uninstalled application. In other examples, uninstallation/removal of an application does not cause removal of shared libraries utilized by the now-uninstalled application; rather, some or all of these shared libraries can be considered for removal only if no installed applications refer to the shared libraries. Then, if the now-uninstalled application was the last application referring to a (particular version of) a particular shared library, the (particular version of the) particular shared library can be considered for removal.

In still other examples, usage statistics can be gathered on a per-device and/or per-repository/per-partition basis. For example, if a partition of a computing device stores Y different versions of shared libraries, each of the Y versions can be considered to be used by the computing device in determining usage statistics for shared libraries. These usage statistics can be used to determine which libraries are suitable for pre-installation; that is, the usage statistics can indicate which are the most commonly used (versions of) shared libraries, and the most commonly used (versions of) shared libraries can then be pre-installed on new devices.

An application store (or other entity) can include one or more web pages or other listings of libraries and versions thereof that are supported as shared libraries for applications using the application store (or other entity). A web page or other listing for a supported version of a shared library can include one or more of: (a) a link to the supported version of a shared library; i.e., to enable a developer to download the supported version of the shared library for software development, testing, and/or building; (b) hash sum information for the supported version of a shared library; (c) information about building with the shared library, such as information about building a stripped software package that includes the supported version of the shared library and/or creating a stripped executable that does not include the supported version of the shared library (d) other information about the supported version of a shared library, such as shared library size, author/entity information about the library, creation and/or publication dates, library name, library version number, etc. In some cases, the web page(s)/listing(s) can include information about multiple supported versions of one library; e.g., for library shared library SL3, the web page(s)/listing(s) can include information about SL3, versions 1.1 and 1.2, assuming versions 1.1 and 1.2 of SL3 are supported versions.

FIG. 1 shows software packages 110, 120 stored by one or more computing devices acting as server(s) of application store 100, in accordance with an example embodiment. Library software package 110 can be used to provide one or more software libraries, such as included software library 112. Library software package 110 also includes library information 114 for declaring properties and/or providing data about software library 112. For example, library information 114 can include shared-library metadata, such as one or more tags, with data about software library 112.

An example "static-library" tag to declare software library 112 as version 1.2.3 of a static library named as "foo.bar.lib" is:

```
<static-library
    name="foo.bar.lib"
    version="1.2.3"/>.
```

As shown above, the example "static-library" tag can specify a library name; e.g., "foo.bar.lib", and version number; e.g., "1.2.3".

Other software, such as application software, can depend on one or more libraries, such as software library 112. Such dependencies can be declared in shared library information that is part of a software package providing the supplication software. FIG. 1 shows application software package 120 that includes software application 122, shared library information 124, and application information 126. In some examples, shared library information 124 and/or application information 126 are not present in application software package 120.

Software application 122 can include one or more executables having instructions that, when loaded and executed into a computing device, cause the computing device to perform functionality of software application 122. An executable can be a full executable or a stripped executable. For example, a full executable can be an executable that includes instructions for software application 122 and instructions of one or more libraries; i.e., a full executable can include part or all of software application 122 and one or more statically linked libraries. As another example, a stripped executable can be an executable that includes instructions for software application 122 that depends upon, but excludes instructions of, one or more software libraries; that is, a stripped executable includes a software application that depends on one or more dynamically linked shared libraries not included in the stripped executable.

Shared library information 124 can declare the dependency of software application 122 on one or more shared libraries using one or more tags. For example, an example tag to declare use of version 1.2.3 of a static shared library named as "foo.bar.lib" is:

```
<uses-static-library
    name="foo.bar.lib"
    version="1.2.3"
    />.
```

As shown above, the example "uses-static-library" tag can specify a library name; e.g., "foo.bar.lib", and version number; e.g., "1.2.3".

In some examples, the above-mentioned tag can include information about a digital certificate associated with the library. For example, an example "uses-static-library" tag that includes a SHA-256 hash sum of a signing certificate associated with the version "1.2.3" of the "foo.bar.lib" library mentioned above is:

```
<uses-static-library>
    name="foo.bar.lib"
    version=" 1.2.3"
    certDigest="6C:EC:C5:0E:34:AE:31:BF:B5:67:89:86:D6:D6:D3:73:6C:57:1D:E
    D:2F...">
</uses-static-library>
```

In the example above, the "certDigest" field of the "uses-static-library" tag includes the SHA-256 hash of the signing certificate associated with the version "1.2.3" of the "foo-.bar.lib" library. In some examples, key rotation can be supported when using signing certificates. In other examples, the "certDigest" field of the "uses-static-library" tag can include a hash sum of the library; e.g., a SHA-256 hash or other hash sum of version "1.2.3" of the "foo.bar.lib" library.

In still other examples, a combined name and version identifier of a library can be provided. For example, the combined name and version identifier can be formed by appending the library name with an underscore and the version. As a particular example, the above example "uses-static-library" tag that includes a SHA-256 hash sum can be modified to use a combined name and version number field "name version" that specifies the combined name and version identifier of a library "foo.bar.lib" and version "1.2.3":

```
<uses-static-library>
    name_version="foo.bar.lib_1.2.3"
    certDigest="6C:EC:C5:0E:34:AE:31:BF:B5:67:89:86:D6:D6:D3:73:6C:57:1D:E
D:2F...">
</uses-static-library>
```

In other examples, other naming schemes can be used to combine name and version information to form a combined name and version identifier of a library; e.g., different separators than underscores can be used, the version can precede the library name in the combined identifier, etc.

Other representations of names, versions, hashes, and/or information about a digital certificate associated with the library are possible as well. Further, other tags can have different information in declaring a static library than the above-mentioned "static-library" tag and/or can have different information in declaring use of a static library than the above-mentioned "uses-static-library" tag.

Use of a signing certificate declaration and/or a hash can reduce the likelihood of using a wrong and/or malicious version of the library, even if the correct name and version number are used. Also, use of a signing certificate declaration and/or a hash allows having different sub-versions of a library version, where the sub-versions of the library can be tailored a specific device; e.g., be optimized for a particular screen size, processor, and/or other device components and/or characteristics.

Application information 126 can include data about software application 122 that may not be specified by shared library information 124. For example, application information 126 can include data such as a name of software application 122, a version of software application 122, recent changes/bug fixes for software application 122, information about building software application 122, end-user documentation, and perhaps other data. In some examples, shared library information 124 and application information 126 can be combined; e.g., application information 126 can include shared library information 124.

In some examples, software application 120 is associated with one or more "splits", or additional functionality for software application 120 that can be installed incrementally and separately from installation of software application 120. In these examples, an application software package similar to application software package 126 can be generated for a split of software application 120, where shared library information 124 and/or application information 126 indicates that a split of software application 120 is being installed. In some of these examples, shared library information 124 for a split of software application 120 can add new libraries as dependencies, but cannot change previously declared dependencies for software application 120. More specifically, suppose installed software application 120 had a dependency on shared library SL_PRESPLIT, version V_PRESPLIT, and that a split APP120_SPLIT of software application 120 was to be installed. If shared library information 124 associated with APP120_SPLIT changed the dependency on shared library SL_PRESPLIT, version V_PRESPLIT; e.g., to a dependency to shared library SL_PRESPLIT, version V_PRESPLIT+1, then the shared library information 124 can be rejected. However, shared library information 124 associated with APP120_SPLIT that declares a new dependency on shared library SL_SPLIT1, version V_SPLIT2 will not be rejected in these examples.

Figure 2:
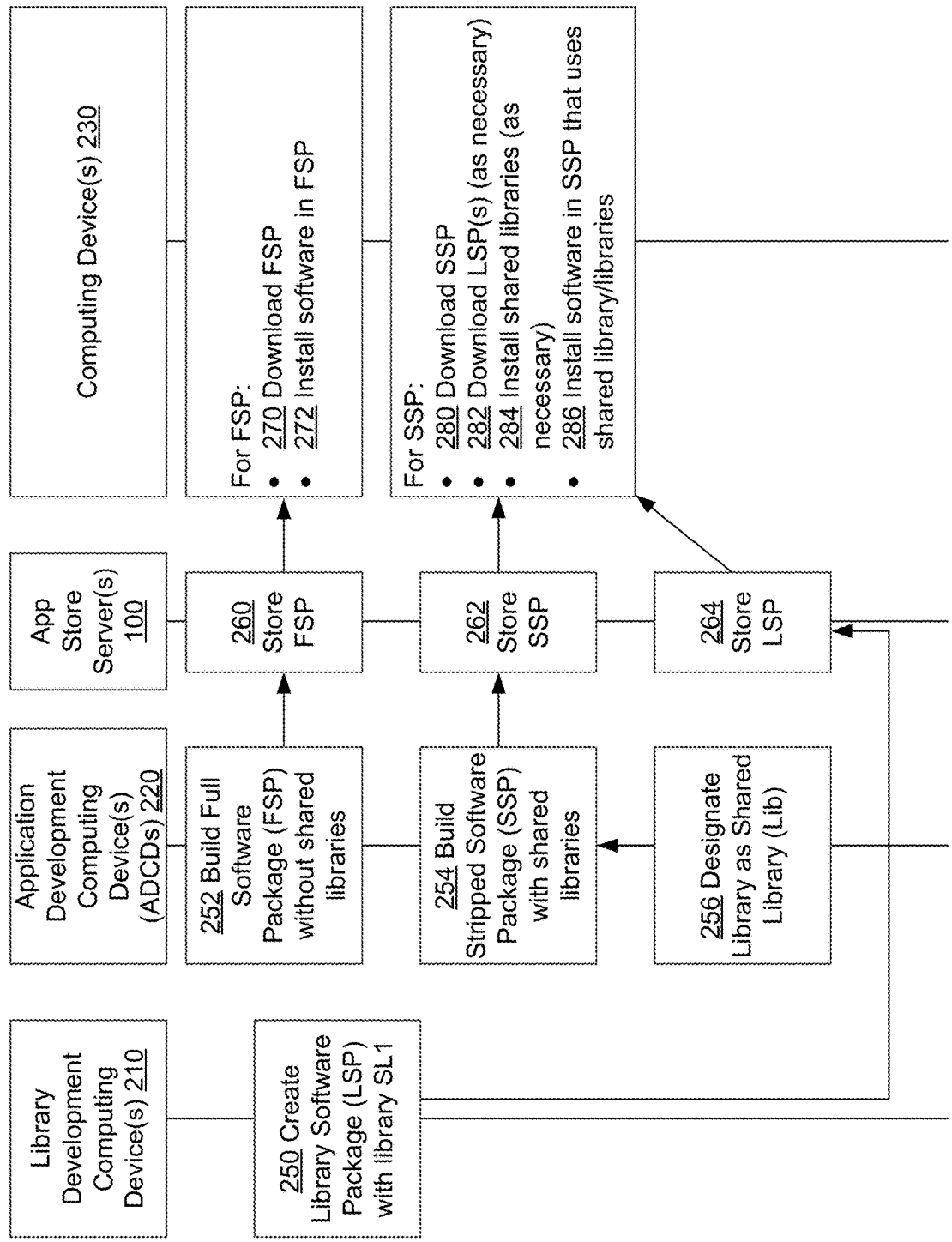
FIG. 2 shows a workflow, in accordance with an example embodiment.

FIG. 2 shows a workflow 200, in accordance with an example embodiment. Workflow 200 shows example actions involved in providing full software packages (FSPs) and shared software packages (SSPs) to computing device 240 using application store server(s) 100. Workflow 200 begins at block 250, where one or more library development computing devices 210 builds/generates a library software package (LSP) having a library SL1. In workflow 200, library SL1 is a versioned software library having a version number of V23.2. Library development computing device(s) 210 can upload the library software package to application store server(s) 100, which can store the library software package at block 264.

Workflow 200 can continue with one or more application development computing devices 220 building/generating a full software package (FSP) and a stripped software package (SSP), each of which includes an executable for an application App123. At block 252, application development computing device(s) 220 can build the full software package, which includes a full executable for App123. At block 260, application development computing device(s) 220 can upload the full software package to application store server(s) 100, which can then store the full software package.

As the full executable for App123 built at block 252 includes any libraries that App123 depends on, the full software package built at block 252 does not include shared library information. In other workflows, the above-mentioned upload software utility can be executed by application development computing device(s) 220 and/or application store server(s) 100 to attempt generation of a stripped software package taking the full software package uploaded at block 260 as an input.

At block 254, application development computing device(s) 220 can build the stripped software package, which includes a stripped executable for App123 and shared-library information for libraries depended upon by App123. At block 262, application development computing device(s) 220 can upload the stripped software package to application store server(s) 100, which can then store the full software package.

In workflow 200, the shared-library information built at block 254 is versioned-shared-library information. For example, if App123 depends on library SL1, version V23.2 (i.e., the library built at block 250), then the shared-library information built at block 254 can specify that App123 utilizes version V23.2 of shared library SL1. In some workflows, the above-mentioned upload software utility can be executed by application development computing device(s) 220 and/or application store server(s) 100 to verify that any libraries listed in versioned-shared-library information of the stripped software package are eligible for sharing; that is, that the specified versions of the specified libraries in the versioned-shared-library information are actually available for sharing.

Upon completion of blocks 260, 262, and 264, application store server(s) 100 store at least full and stripped software packages for App123 as well as a library software package for library SL1, version V23.2. In workflow 200, App123 only depends on one library—library SL1, version V23.2—that is available via application store server(s) 100, and so is eligible for sharing. In other workflows, other applications can depend on zero or more libraries, which may differ from library SL1, version V23.2.

Workflow 200 continues with application store server(s) 100 communicating with one or more computing devices 230 to download full and stripped software packages for App123; i.e., the full and stripped software packages previously uploaded at blocks 260 and 262. A computing device of computing device(s) 230 that downloads a full software package for App123 during workflow 200 can carry out the procedures of blocks 270 and 272. At block 270, the computing device downloads the full software package for App123 from application store server(s) 100. At block 272, after downloading the full software package for App123, the computing device installs App123 using the downloaded full software package.

A computing device of computing device(s) 230 that downloads a stripped software package for App123 during workflow 200 can carry out the procedures of blocks 280, 282, 284, and 286. At block 280, the computing device downloads the stripped software package for App123 from application store server(s) 100. At block 282, the computing device and/or application store server(s) 100 can determine whether shared libraries listed in shared-library information of the stripped software package are stored on the computing device. For example, the computing device and/or application store server(s) 100 can perform one or more of the above-mentioned queries to determine whether the computing device stores one or more versions of one or more shared libraries. If these queries indicate that all of the versions of the shared libraries listed in the shared-library information are stored on the computing device, the procedures of block 282 can be completed. Otherwise, for each version of each shared library not stored on the computing device, the computing device and application store server(s) 100 can communicate to download the version of the shared library onto the computing device.

At block 284, if any shared libraries were downloaded at block 282, then those downloaded shared libraries can be installed onto the computing device. In workflow 200, the computing device had installed a copy of shared library SL1, version 23.2 prior to downloading the stripped software package, so no shared libraries are installed at block 284. In related workflows, a copy of the library software package uploaded at block 264 can be downloaded from application store server(s) at block 282 and installed at block 284. At block 286, the computing device can install App123 using the stripped software package. Upon completion of block 286, workflow 200 can be completed.

Figure 3A:
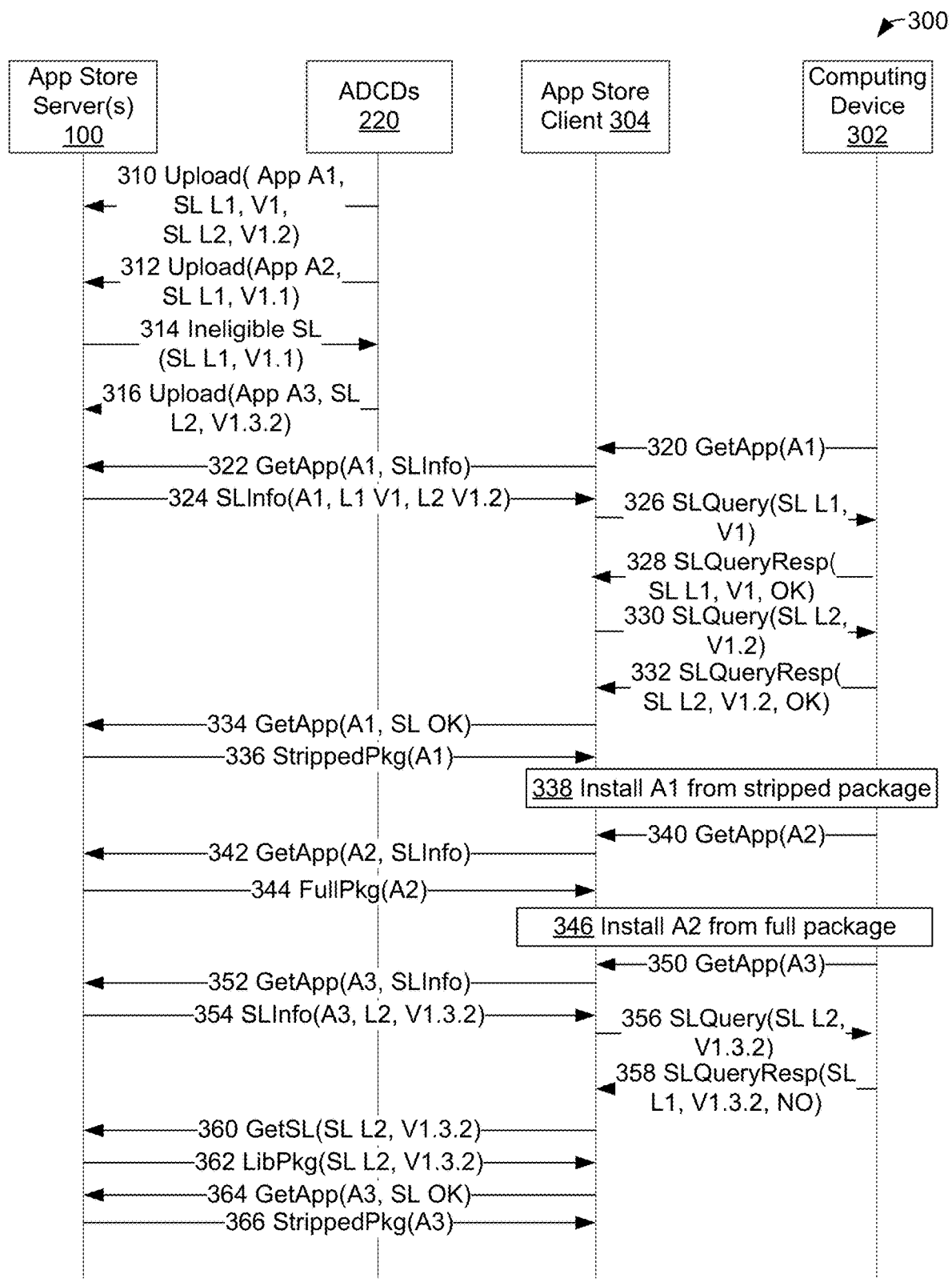
FIGS. 3A and 3B show a scenario involving creation and installation of software applications using software packages and shared stored libraries, in accordance with an example embodiment.
Figure 3B:
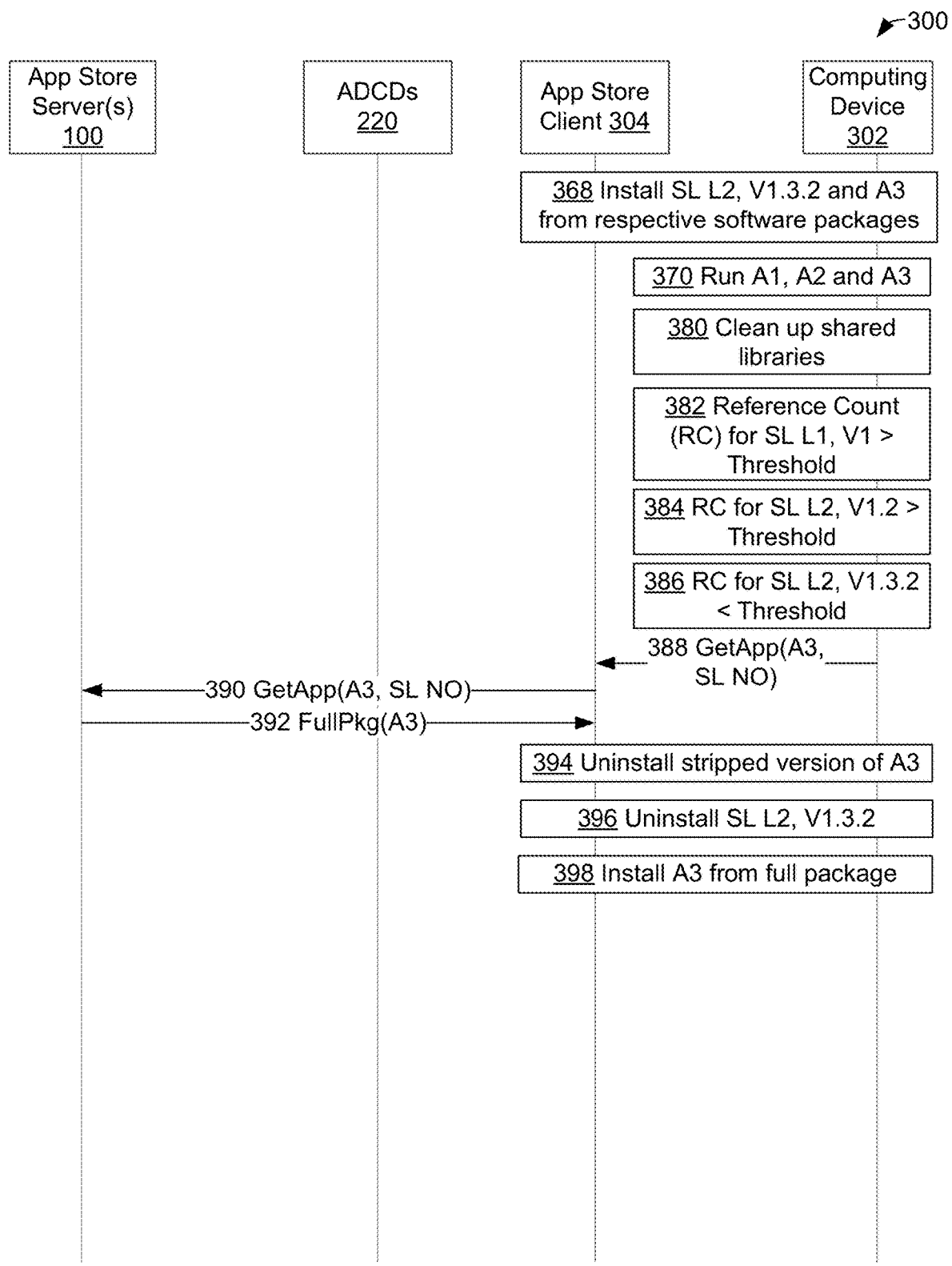

FIGS. 3A and 3B show scenario 300 involving creation and installation of software applications using software packages and shared stored libraries, in accordance with an example embodiment. In scenario 300, one or more application computing development devices 220 create and upload software packages to one or more application store servers 100 for three applications: A1, A2, and A3. A1 depends upon two libraries: library L1, version V1 and library L2, version V1.2. A2 depends upon one library: library L1, version V1.1. And, A3 depends upon one library—library L2, version V1.3.2. In scenario 300, version V1 of library L1 and versions V1.2 and V1.3.2 of library L2 are eligible for sharing, while version V1.1 of library L1 is ineligible for sharing. As such, stripped software packages are available for subsequent downloading of A1 and A3, but not for A2.

Scenario 300 continues with computing device 302, which includes application store client 304, requesting downloads of applications A1, A2, and A3 from application store server(s) 100. At the onset of these requests, computing device 302 supports the use of shared libraries and has library L1, version V1 and library L2, version V1.2 already installed, but not library L2, version V1.3.2. In scenario 300, application store client 304 performs the above-mentioned functionality of a download software utility, as discussed in detail below. In other scenarios, some or all of the functionality described herein as being part of application store client 304 can be provided by application store server(s) 100.

More generally, computing device 302's support for the use of shared libraries includes computing device 302 being configured to store a plurality of versions of a particular shared library identified by identifier and version, where each of the plurality of versions of the particular shared library share a common name/identifier, and where each of the plurality of versions of the particular software library has a different version/version number. For example, computing device 302 can store multiple versions having different version numbers of library L1, library L2, and/or one or more other named libraries; e.g., store two versions of a library L3 one having version number "V3.1" and another having version number "V4.0". In other examples, computing device 302 can store up to a maximum number of different software libraries, where each of the different software libraries is identified both by name/identifier and version/version number; e.g., a maximum of 5, 10, 12, or some other number of versions of all named libraries stored on. In some examples, computing device 302 can allocate a maximum of amount of storage (e.g., 10 megabytes, 100 megabytes, 10 gigabytes) to storing shared libraries. Other examples are related to storing multiple shared libraries are possible as well.

In this context, computing device 302 and application store client 304 download and install: a stripped software package for A1, a full software package for A2, and a library software package for library L2, version V1.3.2 and a stripped software package for A3.

Subsequently, computing device 302 determines that data storage is to be freed; and as part of freeing data storage, that shared libraries are to be cleaned up. For example, computing device 302 can determine that data storage is to be freed including cleaning up shared libraries, due to: a maximum number of shared libraries being stored, a maximum amount of data storage being used to store shared libraries, a periodic (e.g., hourly, weekly, daily) or on-demand audit of data storage indicates that shared libraries are to be cleaned up, perhaps because a free amount of data storage available to computing device 302 is relatively low, an age of a shared library and/or for other reasons. As such, computing device 302 can subsequently attempt to cleanup shared libraries.

An age of a shared library can be an amount of time associated with the existence of the shared library; an amount of time since the shared library was created, an amount of time since the shared library was stored on a computing device, or some other amount of time. Then, shared libraries can be cleaned up based on their respective ages. For example, after computing device 302 determines an age of a shared library SL_OLD, version V_OLD and that the age of shared library SL_OLD, version V_OLD exceeds a threshold age (e.g., 6 months, 1 year, 2 years, etc.); then computing device 302 can determine if the reference count for shared library SL_OLD, version V_OLD is greater than zero. If the reference count for shared library SL_OLD, version V_OLD is greater than zero, computing device 302 can determine an application A_OLD that depends on shared library SL_OLD, version V_OLD and can replace a stripped executable for A_OLD that depends on shared library SL_OLD, version V_OLD with a full executable that includes a copy of shared library SL_OLD, version V_OLD; e.g., by downloading a full executable package for A_OLD. Then, after replacing the stripped executable for A_OLD with the corresponding full executable, computing device 302 can free data storage for shared library SL_OLD, version V_OLD on the computing device.

At the time of cleanup, a number of applications using/reference count for each of library L1, version V1 and library L2, version V1.2 exceeds a threshold, but the number of applications using/reference count for library L2, V1.3.2 does not exceed the threshold. As such, library L2, version V1.3.2 is cleaned up by installing a full executable for application A3 (which depends on library L2, version V1.3.2) and then deleting both the previously-installed stripped executable and copy of library L2, version V1.3.2 from storage of computing device 302. Upon completion of the cleanup of library L2, version V1.3.2, scenario 300 can end.

FIG. 3A shows that scenario 300 can begin with application computing development device(s) 220 generating and sending upload message 310 to application store server(s) 100. Upload message 310 includes two software packages for application A1—a full software package and a stripped software package. The full software package includes a full executable for application A1. The stripped software package includes a stripped executable for application A1 and shared-library information about two shared libraries (SLs) that application A1 depends upon: "L1, V1" and "L2, V1.2".

In scenario 300, application store server(s) 100 executes an upload software utility to process upload message 310. The upload software utility verifies that the two shared libraries listed in shared-library information—library L1, version V1 and library L2, version V1.2—are eligible for sharing, and subsequently stores the received full and stripped software packages. At this point, both full and stripped software packages for application A1 are available for downloading from application store server(s) 100.

Then, application computing development device(s) 220 generate and send upload message 312 to application store server(s) 100. Upload message 312 includes two software packages for application A2—a full software package and a stripped software package. The full software package includes a full executable for application A2. The stripped software package includes a stripped executable for application A2 and shared-library information about a shared library "L1, V.1.1" that application A2 depends upon.

In scenario 300, application store server(s) 100 executes an upload software utility to process upload message 312, which determines that library L1, version V1.1 specified in the shared-library information is ineligible for sharing. In response to determining that library L1, version V1.1 is ineligible for sharing, application store server(s) 100 generate and send ineligible shared library message 314 to inform application computing development device(s) 220 about the ineligible shared library. The upload software utility then rejects the stripped software package and stores the received full software package. At this point, the full software package for application A2 is available for downloading from application store server(s) 100.

In other scenarios, the upload software utility and/or other components of application store server(s) 100 can reject a stripped software package due to ineligible shared libraries silently; that is, ineligible shared library message 314 may not be sent in these other scenarios. In some other scenarios, application computing development device(s) 220 can generate and send one or more additional upload messages with different shared-library information listing only eligible shared libraries; e.g., a version of upload message 312 with a stripped software package including shared-library information listing a dependency on eligible shared library L1, version V1. The additional upload message(s) may or may not have a full software package accompanying the stripped software package with the different shared-library information.

In still other scenarios, the upload software utility and/or other components of application store server(s) 100 can determine that, even though library L1, version V1.1 is not currently eligible for sharing, library L1, version V1.1 should be made eligible for sharing in response to upload message 312 and/or other upload messages that include shared-library information listing library L1, version V1.1. For example, if application store server(s) 100 receive at least a threshold number of references (e.g., 4, 10, 20, 100, 15,000, etc.) to a particular version of a particular library and if application store server(s) 100 store a copy of a library software package of the particular version of the particular library, then application store server(s) 100 can determine that the particular version of a particular library is an eligible shared library.

Then, application computing development device(s) 220 generate and send upload message 316 to application store server(s) 100. Upload message 316 includes a full software package and a stripped software package for application A3. The full software package includes a full executable for application A3. The stripped software package includes a stripped executable for application A3 and shared-library information about a shared library "L2, V.1.3.2" that application A3 depends upon. In scenario 300, application store server(s) 100 executes an upload software utility to process upload message 316. The upload software utility verifies that library L2, version V1.3.2 is eligible for sharing, and subsequently stores the received full and stripped software packages. At this point, both full and stripped software packages for application A3 are available for downloading from application store server(s) 100.

Scenario 300 continues with computing device 302 generating and sending GetApp message 320 to application store client 304 requesting a copy of application A1. Application store client 304, which includes software executing on computing device 302, receives GetApp message 320, and sends GetApp message 322 to application store server(s) 100 requesting a copy of application A1 and a "SLInfo" indication to request shared library information for application A1. By the "SLInfo" indication, computing device 302 signals support of shared libraries for application A1. In other scenarios, other indicia of support for shared libraries or lack thereof can be used; e.g., an indication of a version of an operating system being utilized by computing device 302 that does or does not support shared libraries.

After receiving GetApp message 322, application store server(s) 100 can generate and send SLInfo message 324 to application store client 304. SLInfo message 324 can provide versioned shared library information to application store client 304, and therefore to computing device 302, about application A1. In particular, SLInfo message 324 indicates that application A1 depends on library "L1", version "V1" and depends on library "L2", version "V1.2".

After receiving SLInfo message 324, application store client 304 can obtain information about what shared libraries are stored on computing device 302 on behalf of application store server(s) 100. To obtain this information, application store client 304 generates and sends SLQuery message 326 to other components of computing device 302; e.g., library-management software to determine whether computing device 302 stores a copy of library "L1", version "V1", as application A1 depends on library L1, version V1 as indicated above in the context of SLInfo message 324.

Computing device 302 can receive SLQuery message 326, which includes queried library identifier "L1" and queried library version "V1". Computing device 302 can then determine whether computing device 302 stores a copy of library "L1", version "V1" as identified by a stored identifier of the library "L1" and a stored version "V1"; e.g., the stored identifier and/or the stored version can be: part or all of a unique name of a stored library using the unique name generation techniques discussed above, in shared-library information stored by computing device 302, and/or determined using other techniques. Then, computing device 302 can match the queried library version "V1" with the stored version "V1" of library "L1". For example, computing device 302 can match the queried library version "V1" with the stored version "V1" of library "L1" based on a dependency type, such as discussed above as an exact dependency type, a minimum dependency type, and a template dependency type.

As indicated above, an exact dependency type match involves exactly matching the queried library identifier and queried library version with the respective stored library identifier and stored library version; a minimum dependency type match involves matching the queried library identifier with the stored library identifier and matching the queried library version as long as the stored library version is greater than or equal to the queried library version; and a template dependency type involves matching the queried library identifier with the stored library identifier and matching the queried library version as long as the stored library version matches a templated queried library version. Other matching techniques are possible as well.

After matching the queried library version with the stored version, computing device 302 can determine that the computing device does store a copy of library "L1", version "V1". After determining that the computing device does store a copy of library "L1", version "V1", computing device 302 can respond to SLQuery message 326 with a response indicating that computing device 302 does store a copy of the queried software library.

In scenario 300, computing device 302 does store a copy of library L1, version V1, and subsequently generates and sends SLQueryResp message 328, which has an "OK" indication to inform application store client 304 that computing device 302 does store a copy of library L1, version V1.

Application store client 304 can generate and send SLQuery message 330 to computing device 302 to determine whether computing device 302 stores a copy of library "L2", version "V1.2", as application A1 also depends on library L2, version V1.2 as indicated above in the context of SLInfo message 324. In scenario 300, computing device 302 can use the techniques discussed above in the context of SLQuery message 326 to determine that computing device 302 does store a copy of library L2, version V1.2. Computing device 302 subsequently generates and sends SLQueryResp message 332, which has an "OK" indication to inform application store client 304 that computing device 302 does store a copy of library L2, version V1.2.

After receiving SLQueryResp message 332, application store client 304 can generate and send GetApp message 334 to convey the request for application A1 with an "SL OK" indication. The "SL OK" indication informs application store server(s) 100 that computing device 302 can utilize stripped executables that rely on shared libraries and already stores copies of all shared libraries that application A1 depends upon. Then, application store server(s) 100 can generate and send StrippedPkg message 336 that includes a copy of a stripped software package with a stripped executable for application A1.

At block 338, computing device 302 and application store client 304 install application A1 from the stripped software package received via StrippedPkg message 330. Installing application A1 involves installing the stripped executable for A1 received via StrippedPkg message 330. In other scenarios, application store client 304 is not involved in installing software packages on computing device 302.

Then, computing device 302 generates and sends GetApp message 340 to application store client 304 requesting a copy of application A2. Application store client 304 receives GetApp message 340, and sends GetApp message 342 to application store server(s) 100 requesting a copy of application A2 and a "SLInfo" indication to request shared library information for application A2.

In scenario 300, only full application packages are available for application A2 due to ineligible libraries as discussed above in the context of messages 312 and 314. Consequently, application store server(s) 100 generate and send FullPkg message 344 that includes a copy of a full software package with a full executable for application A2. At block 346, computing device 302 and application store client 304 install application A2 from the full software package. Installing application A2 involves installing the full executable for A2 received via FullPkg message 344.

Then, computing device 302 generates and sends GetApp message 350 to application store client 304 requesting a copy of application A3. Application store client 304 receives GetApp message 350, and sends GetApp message 352 to application store server(s) 100 requesting a copy of application A3 and a "SLInfo" indication to request shared library information for application A3.

After receiving GetApp message 352, application store server(s) 100 can generate and send SLInfo message 354 to application store client 304. SLInfo message 354 can provide versioned shared library information to application store client 304 and computing device 302 about application A3. In particular, SLInfo message 354 indicates that application A3 depends on library "L2", version "V1.3.2".

After receiving SLInfo message 354, application store client 304 can obtain information about what shared libraries are stored on computing device 302 on behalf of application store server(s) 100. To obtain this information, application store client 304 generates and sends SLQuery message 356 to other components of computing device 302; e.g., library-management software to determine whether computing device 302 to determine whether computing device 302 stores a copy of library "L2", version "V1.3.2", as application A3 depends on library L2, version V1.3.2 as indicated above in the context of SLInfo message 354.

In scenario 300, computing device 302 can use the techniques discussed above in the context of SLQuery message 326 to determine that computing device 302 does not store a copy of library L2, version V1.3.2. Computing device 302 subsequently generates and sends SLQueryResp message 358, which has an "NO" indication to inform application store client 304 that computing device 302 does not store a copy of library L2, version V1.3.2. As such, SLQueryResp message 358 can act as a request to application store client 304 to locate a copy of missing library L2, version V1.3.2, version V1.3.2 based on the name/identifier "L2" and the version number "V.1.3.2" of the missing library.

In response to SLQueryResp message 358, application store client 304 can generate and send GetSL message 360 to application store server(s) 100 to request a library software package for library L2, version 1.3.2. In response to GetSL message 360, application store server(s) 100 can send LibPkg message 362 with a copy of a library software package for library L2, version 1.3.2 to application store client 304.

After receiving LibPkg message 362, application store client 304 can determine that computing device 302 has copies of all shared libraries used by application A3. Then, application store client 304 can generate and send GetApp message 364 to convey the request for application A3 with an "SL OK" indication. The "SL OK" indication informs application store server(s) 100 that computing device 302 can utilize stripped executables that rely on shared libraries and already stores copies of all shared libraries that application A3 depends upon. Then, application store server(s) 100 can generate and send StrippedPkg message 366 that includes a copy of a stripped software package with a stripped executable for application A3.

Turning to FIG. 3B, upon reception of LibPkg message 362 and StrippedPkg message 366, computing device 302 and application store client 304 can carry out the procedures of block 368. At block 368, computing device 302 and application store client 304 installs library L2, version V1.3.2 from the library software package received via LibPkg message 362 and application A3 from the stripped software package received via StrippedPkg message 366.

LibPkg message 362 can be considered as a response to the request embodied by SLQueryResp message 358 to locate a copy of missing library L2, version V1.3.2, and thus, application store client 304 has successfully located missing library L2, version V1.3.2 for computing device 302. By installing previously missing library L2, version V1.3.2 received via LibPkg message 362, computing device 302 can store the previously-missing library missing library L2, version V1.3.2. Installing application A3 involves installing the stripped executable for A3 received via StrippedPkg message 366.

At block 370, computing device 302 executes each of applications A1, A2, and A3 at least once. For example, executing application A1 can involve loading an executable for A1 and any shared libraries that A1 depends upon into data storage (i.e., RAM and/or cache memory) of computing device 302. In this case, loading the executable for A1 and shared libraries that A1 depends upon can include loading the stripped executable for A1 installed at block 332 and loading shared libraries library L1, version V1.1 and library L2, version V1.2, where both shared libraries can be identified using their respective names/identifiers "L1" and "L2" and respective versions "V1.1" and "V1.2". In some examples, library L1, version V1.1 and/or library L2, version V1.2 can already be loaded into data storage; in these examples, the stripped executable for A1 can refer to the already-loaded library or libraries, and reloading of the already-loaded library or libraries can be omitted.

Then, after loading the executable for A1 and the shared libraries that A1 depends upon, computing device 302 can execute the loaded software executable to cause the computing device to perform one or more functions of application A1, where at least one of these functions of the one or more functions is performed using software stored in library L1, version V1.1 and/or library L2, version V1.2. Similar techniques can be used to execute application A2 or application A3; for application A2, which has a full executable, the techniques related to loading shared libraries can be omitted.

At block 380, computing device 302 determines that shared library storage is to be cleaned up. That is, computing device 302 proceeds to attempt to reduce the amount of storage used of shared libraries stored on the computing device. To cleanup shared library storage, computing device 302 can determine reference counts for each version of each shared library. A reference count for a particular version of a particular shared library can be a number of applications that depend upon the particular version of the particular shared library. For example, the reference count can be determined as discussed above in the context of library-management software.

Then, if the reference count for the particular version of the particular shared library is less than a threshold reference count, the particular version of the particular shared library can be uninstalled. Also, any stripped executables that depend upon the now-uninstalled particular version of the particular shared library can be replaced by corresponding full executables.

At block 382, computing device 302 determines that a reference count for shared library L1, version V1, or number of applications that use shared library L1, version V1 exceeds a threshold reference count. In scenario 300, the threshold reference count is set to 2; in other scenarios, different threshold reference count values can be used; e.g., 1, 3, 4, 5, 10. Thus, shared library L1, version V1 is unaffected by this cleanup.

At block 384, computing device 302 determines that a reference count for shared library L2, version V1.2 exceeds the threshold reference count. Thus, shared library L2, version V1.2 is unaffected by this cleanup.

At block 386, computing device 302 determines that a reference count for shared library L2, version V1.3.2 is less than the threshold reference count. In scenario 300, only application A3 depends upon shared library L2, version V1.3.2, and so the corresponding reference count is 1, which is less than the threshold reference count of 2. Thus, shared library L2, version V1.3.2 is subject to cleanup; that is, shared library L2, version V1.3.2 can be uninstalled and any stripped executables that depend upon shared library L2, version V1.3.2 can be replaced by corresponding full executables.

As such, the stripped executable of application A3 installed at block 368 is subject to replacement by a corresponding full executable. To obtain the full executable for application A3, computing device 302 generates and sends GetApp message 388 to application store client 304 requesting delivery of application "A3". Application store client 304 conveys GetApp message 388 as GetApp message 390 to application store server(s) 100 requesting delivery of application "A3".

GetApp messages 388 and 390 includes indication "SL NO" to respectively inform application store client 304 and application store server(s) 100 that shared libraries are not supported for application A3; as such, GetApp messages 388 and 390 effectively request delivery of a full executable for application A3. Other techniques for requesting a full executable are possible as well.

In response to GetApp message 390, application store server(s) 100 can use the "A3" and "SL NO" indications to determine that a full software package for application A3 has been requested. Then, application store server(s) 100 generate and send FullPkg message 392 to application store client 304 with a copy of a full software package with a full executable for application A3.

At block 394, computing device 302 and application store client 304 continue with the cleanup of library L2, version V1.3.2 by uninstalling the previously-installed stripped executable for application A3. At block 396, computing device 302 and application store client 304 uninstall the previously-installed shared library L2, version V1.3.2. After block 396 has completed, at least two shared libraries are still installed on computing device 100—library L1, version V1 and library L2, version V1.2. Upon completion of block 396, scenario 300 can be completed. In other scenarios, application store client 304 is not involved with uninstallation of executables, libraries, and/or software packages.

At block 398, computing device 302 and application store client 304 install application A3 from the full software package received via FullPkg message 392. Installing application A3 involves installing the full executable for A3 received via FullPkg message 392. In some scenarios, the order of execution of blocks 394, 396, and 398 can vary from the order of execution of these three blocks used during scenario 300.

Example Data Network

Figure 4:
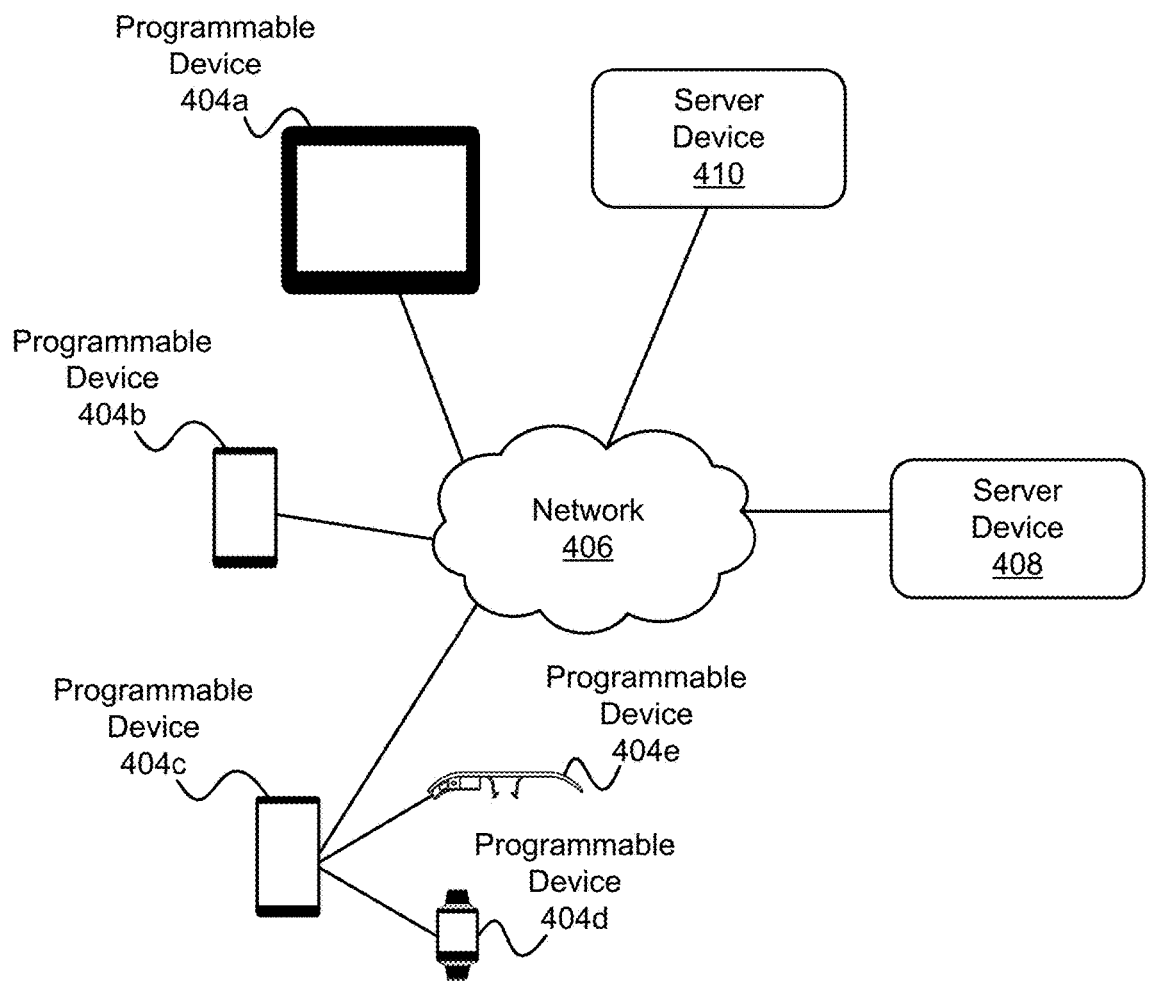
FIG. 4 depicts a distributed computing architecture, in accordance with an example embodiment.

FIG. 4 depicts a distributed computing architecture 400 with server devices 408, 410 configured to communicate, via network 406, with programmable devices 404a, 404b, 404c, 404d, 404e, in accordance with an example embodiment. Network 406 may correspond to a LAN, a wide area network (WAN), a corporate intranet, the public Internet, or any other type of network configured to provide a communications path between networked computing devices. Network 406 may also correspond to a combination of one or more LANs, WANs, corporate intranets, and/or the public Internet.

Although FIG. 4 only shows five programmable devices, distributed application architectures may serve tens, hundreds, or thousands of programmable devices. Moreover, programmable devices 404a, 404b, 404c, 404d, 404e (or any additional programmable devices) may be any sort of computing device, such as an ordinary laptop computer, desktop computer, wearable computing device, mobile computing device, head-mountable device (HMD), network terminal, wireless communication device (e.g., a smart phone and/or cell phone), and so on. In some embodiments, such as indicated with programmable devices 404a, 404b, 404c, programmable devices can be directly connected to network 406. In other embodiments, such as indicated with programmable devices 404d and 404e, programmable devices can be indirectly connected to network 406 via an associated computing device, such as programmable device 404c. In this example, programmable device 404c can act as an associated computing device to pass electronic communications between programmable devices 404d and 404e and network 406. In still other embodiments not shown in FIG. 4, a programmable device can be both directly and indirectly connected to network 406.

Server devices 408, 410 can be configured to perform one or more services, as requested by programmable devices 404a-404e. For example, server device 408 and/or 410 can provide content to programmable devices 404a-404e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 408 and/or 410 can provide programmable devices 404a-404e with access to software for database, search, computation, graphical, audio, video, World Wide Web/Internet utilization, and/or other functions. Many other examples of server devices are possible as well.

Computing Device Architecture

Figure 5A:
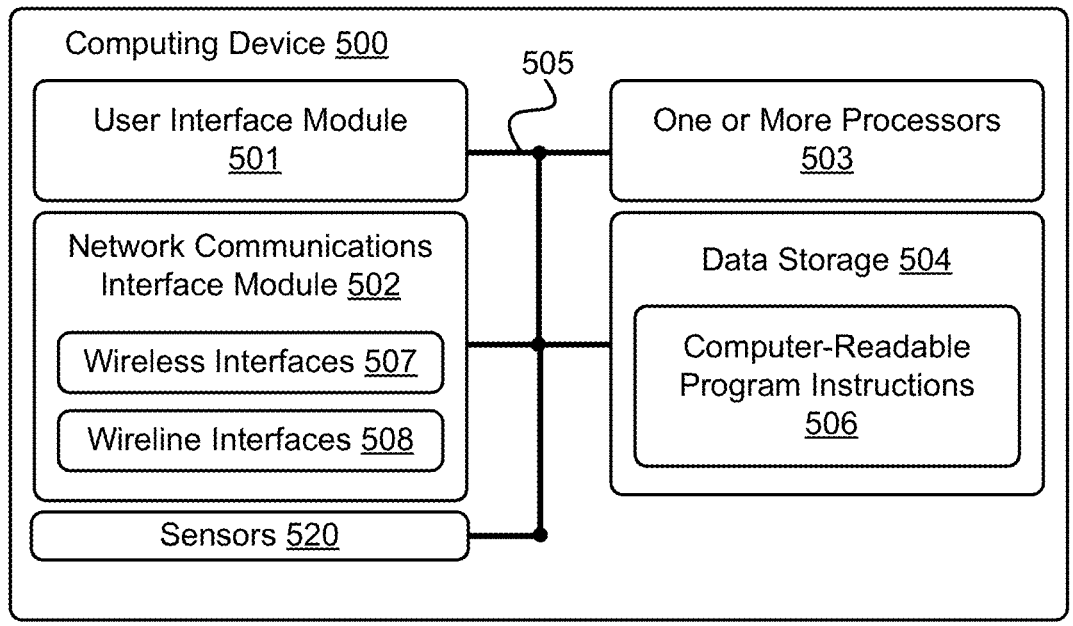
FIG. 5A is a functional block diagram of a computing device, in accordance with an example embodiment.

FIG. 5A is a functional block diagram of computing device 500, in accordance with an example embodiment. In particular, computing device 500 shown in FIG. 5A can be configured to perform at least one function of/related to: herein-described software, application store server(s) 100, library software package 110, application software package 120, workflow 200, library development computing device(s) 210, application development computing device(s) 220, computing device(s) 230, 302, scenario 300, application store client 304, programmable devices 404a, 404b, 404c, 404d, 404e, network 406, server devices 408, 410, and method 600.

Computing device 500 may include a user interface module 501, a network-communication interface module 502, one or more processors 503, data storage 504, and one or more sensors 520, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a computer mouse, a track ball, a joystick, a camera, a voice recognition module, and/or other similar devices. User interface module 501 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices. User interface module 501 can further be configured with one or more haptic devices that can generate haptic output(s), such as vibrations and/or other outputs detectable by touch and/or physical contact with computing device 500. In some embodiments, user interface module 501 can be used to provide a graphical user interface for utilizing computing device 500.

Network-communications interface module 502 can include one or more wireless interfaces 507 and/or one or more wireline interfaces 508 that are configurable to communicate via a network. Wireless interfaces 507 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 503 can include one or more general purpose processors, and/or one or more special purpose processors (e.g., digital signal processors, graphics processing units, application specific integrated circuits, etc.). One or more processors 503 can be configured to execute computer-readable program instructions 506 that are contained in data storage 504 and/or other instructions as described herein.

Data storage 504 can include one or more computer-readable storage media that can be read and/or accessed by at least one of one or more processors 503. The one or more computer-readable storage media can include volatile and/or non-volatile storage components, such as optical, magnetic, organic or other memory or disc storage, which can be integrated in whole or in part with at least one of one or more processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data. In some embodiments, data storage 504 can additionally include storage required to perform at least part of the herein-described methods, scenarios, and techniques and/or at least part of the functionality of the herein-described devices and networks.

In some embodiments, computing device 500 can include one or more sensors 520. Sensor(s) 520 can be configured to measure conditions in an environment of computing device 500 and provide data about that environment. For example, sensor(s) 520 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of computing device 500, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 500, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 500, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 520 are possible as well.

Cloud-Based Servers

Figure 5B:
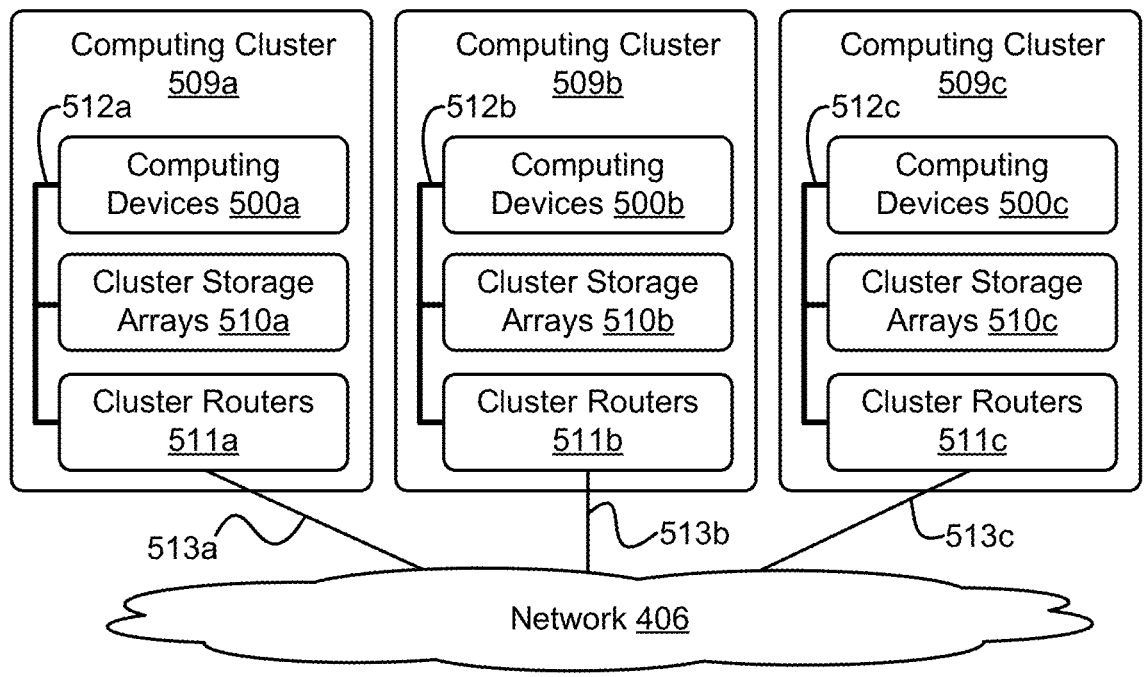
FIG. 5B depicts a network of computing clusters arranged as a cloud-based server system, in accordance with an example embodiment.

FIG. 5B depicts a network 514 of computing clusters 509a, 509b, 509c arranged as a cloud-based server system in accordance with an example embodiment. Computing clusters 509a, 509b, 509c can be cloud-based devices that store program logic and/or data of cloud-based applications and/or services; e.g., perform at least one function of/related to: herein-described software, application store server(s) 100, library software package 110, application software package 120, workflow 200, library development computing device(s) 210, application development computing device(s) 220, computing device(s) 230, 302, scenario 300, application store client 304, programmable devices 404a, 404b, 404c, 404d, 404e, network 406, server devices 408, 410, and method 600.

In some embodiments, computing clusters 509a, 509b, 509c can be a single computing device residing in a single computing center. In other embodiments, computing clusters 509a, 509b, 509c can include multiple computing devices in a single computing center, or even multiple computing devices located in multiple computing centers located in diverse geographic locations. For example, FIG. 5B depicts each of computing clusters 509a, 509b, and 509c residing in different physical locations.

In some embodiments, data and services at computing clusters 509a, 509b, 509c can be encoded as computer readable information stored in non-transitory, tangible computer readable media (or computer readable storage media) and accessible by other computing devices. In some embodiments, computing clusters 509a, 509b, 509c can be stored on a single disk drive or other tangible storage media, or can be implemented on multiple disk drives or other tangible storage media located at one or more diverse geographic locations.

FIG. 5B depicts a cloud-based server system in accordance with an example embodiment. In FIG. 5B, functionality of herein-described software, an application store server, an application store client, a library development computing device, an application development computing device, and/or a computing device can be distributed among computing clusters 509a, 509b, 509c. Computing cluster 509a can include one or more computing devices 500a, cluster storage arrays 510a, and cluster routers 511a connected by a local cluster network 512a. Similarly, computing cluster 509b can include one or more computing devices 500b, cluster storage arrays 510b, and cluster routers 511b connected by a local cluster network 512b. Likewise, computing cluster 509c can include one or more computing devices 500c, cluster storage arrays 510c, and cluster routers 511c connected by a local cluster network 512c.

In some embodiments, each of computing clusters 509a, 509b, and 509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 509a, for example, computing devices 500a can be configured to perform various computing tasks of herein-described software, an application store server, an application store client, a library development computing device, an application development computing device, and/or a computing device. In one embodiment, the various functionalities of herein-described software, an application store server, an application store client, a library development computing device, an application development computing device, and/or a computing device can be distributed among one or more of computing devices 500a, 500b, 500c. Computing devices 500b and 500c in respective computing clusters 509b and 509c can be configured similarly to computing devices 500a in computing cluster 509a. On the other hand, in some embodiments, computing devices 500a, 500b, and 500c can be configured to perform different functions.

In some embodiments, computing tasks and stored data associated with herein-described software, an application store server, an application store client, a library development computing device, an application development computing device, and/or a computing device can be distributed across computing devices 500a, 500b, and 500c based at least in part on the processing requirements of herein-described software, an application store server, an application store client, a library development computing device, an application development computing device, and/or a computing device, the processing capabilities of computing devices 500a, 500b, 500c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 510a, 510b, 510c of computing clusters 509a, 509b, 509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of herein-described software, an application store server, an application store client, a library development computing device, an application development computing device, and/or a computing device can be distributed across computing devices 500a, 500b, 500c of computing clusters 509a, 509b, 509c, various active portions and/or backup portions of these components can be distributed across cluster storage arrays 510a, 510b, 510c. For example, some cluster storage arrays can be configured to store one portion of the data of herein-described software, an application store server, an application store client, a library development computing device, an application development computing device, and/or a computing device, while other cluster storage arrays can store other portion(s) of data of herein-described software, an application store server, an application store client, a library development computing device, an application development computing device, and/or a computing device. Additionally, some cluster storage arrays can be configured to store backup versions of data stored in other cluster storage arrays.

Cluster routers 511a, 511b, 511c in computing clusters 509a, 509b, 509c can include networking equipment configured to provide internal and external communications for the computing clusters. For example, cluster routers 511a in computing cluster 509a can include one or more internet switching and routing devices configured to provide (i) local area network communications between computing devices 500a and cluster storage arrays 510a via local cluster network 512a, and (ii) wide area network communications between computing cluster 509a and computing clusters 509b and 509c via wide area network connection 513a to network 406. Cluster routers 511b and 511c can include network equipment similar to cluster routers 511a, and cluster routers 511b and 511c can perform similar networking functions for computing clusters 509b and 509b that cluster routers 511a perform for computing cluster 509a.

In some embodiments, the configuration of cluster routers 511a, 511b, 511c can be based at least in part on the data communication requirements of the computing devices and cluster storage arrays, the data communications capabilities of the network equipment in cluster routers 511a, 511b, 511c, the latency and throughput of local networks 512a, 512b, 512c, the latency, throughput, and cost of wide area network links 513a, 513b, 513c, and/or other factors that can contribute to the cost, speed, fault-tolerance, resiliency, efficiency and/or other design criteria of the moderation system architecture.

Example Methods of Operation

Figure 6:
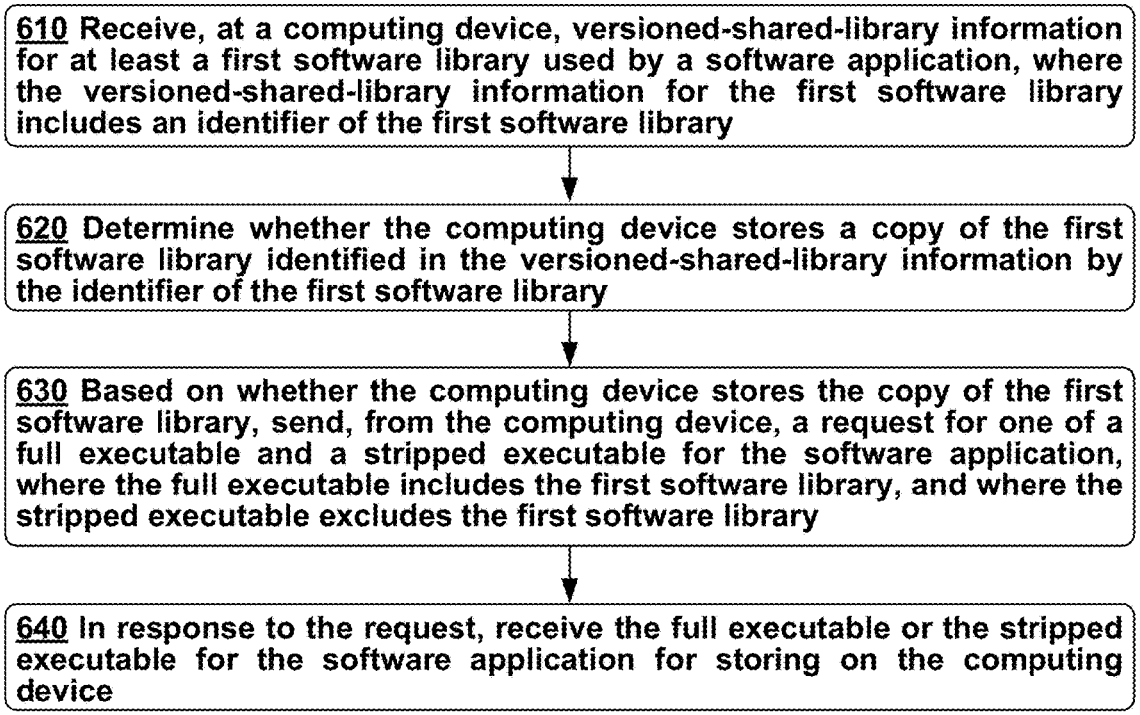
FIG. 6 is a flowchart of a method, in accordance with an example embodiment.

FIG. 6 is a flowchart of method 600, in accordance with an example embodiment.

Method 600 can be executed by a computing device, such as computing device 500. Method 600 can begin at block 610, where the computing device can receive versioned-shared-library information for at least a first software library used by a software application, where the versioned-shared-library information for the first software library can include an identifier of the first software library, such as discussed above at least in the context of FIGS. 2-3B. In some embodiments, the versioned-shared-library information for at least the first software library further includes information related to a hash sum of the first software library, such as discussed above at least in the context of FIG. 1.

At block 620, the computing device can determine whether the computing device stores a copy of the first software library identified in the versioned-shared-library information by the identifier of the first software library, such as discussed above at least in the context of FIGS. 2-3B.

In some embodiments, the versioned-shared-library information for the first software library can further include a version of the first software library and the first software library is further identified by the version of the first software library; i.e., the computing device can determine whether the computing device stores a copy of the first software library identified in the versioned-shared-library information by the identifier of the first software library and the version of the first software library, such as discussed above at least in the context of FIGS. 2-3B. In particular of these embodiments, the versioned-shared-library information for the first software library can include a combined identifier specifying both a name of the first software library and the version of the first software library, such as discussed above at least in the context of FIG. 1.

In other embodiments, determining whether the computing device stores a copy of the first software library identified by the identifier of the first software library and the version of the first software library can include: receiving a query regarding storage of a software library, the query including a queried library identifier and a queried library version; determining whether the computing device stores a copy of the first software library identified by a stored identifier of the first software library and the stored version of the first software library by at least matching the queried library version with the stored version of the first software library; and after matching the queried library version with the stored version of the first software library, determining that the computing device does store a copy of the first software library, such as discussed above at least in the context of FIGS. 3A and 3B. In particular of these embodiments, matching the queried library version with the stored version of the first software library can include exactly matching the queried library version with the stored version of the first software library, such as discussed above at least in the context of FIGS. 3A and 3B. In other particular of these embodiments, matching the requested library version with the stored version of the first software library can include determining whether the stored version of the software library is at least the queried library version, such as discussed above at least in the context of FIGS. 3A and 3B.

At block 630, the computing device can, based on whether the computing device stores the copy of the first software library, send a request for one of a full executable and a stripped executable for the software application, where the full executable includes the first software library, and where the stripped executable excludes the first software library, such as discussed above at least in the context of FIGS. 2-3B.

At block 640, the computing device can, in response to the request, receive the full executable or the stripped executable for the software application for storing on the computing device, such as discussed above at least in the context of FIGS. 2-3B.

In some embodiments, receiving the full executable or the stripped executable includes receiving the stripped executable; then, method 600 can further include: loading the stripped executable and the first software library into data storage of the computing device, where the first software library is identified using the identifier of the first software library and the version of the first software library; and after loading the stripped executable and the first software library into data storage, the computing device executing the loaded stripped executable to cause the computing device to perform one or more functions, where at least one function of the one or more functions is performed using software stored in the first software library, such as discussed above at least in the context of FIGS. 3A and 3B. In particular of these embodiments, method 600 can further include: after determining that the computing device does not store a copy of the first software library, locating a copy of the first software library based on the identifier of the first software library and the version of the first software library, and storing the located copy of the first software library on the computing device, such as discussed above at least in the context of FIGS. 3A and 3B. In more particular of these embodiments, locating the copy of the first software library includes: sending a request for a copy of the first software library, where the request includes the identifier of the first software library and the version of the first software library, and after sending the request, receiving the copy of the first software library at the computing device, such as discussed above at least in the context of FIGS. 3A and 3B.

In other embodiments, the computing device can be configured to store a plurality of versions of a second software library identified by identifier and version, where each of the plurality of versions of the second software library share a common identifier, and where each of the plurality of versions of the second software library differs, such as discussed above at least in the context of FIGS. 1-3B. In some of these embodiments, the computing device can be configured to store a particular number of versions of the second software library, such as discussed above at least in the context of FIGS. 3A and 3B. In further of these embodiments, the computing device can be configured to determine a number of applications that use a first version of the second software library, such as discussed above at least in the context of FIGS. 3A and 3B. In still further of these embodiments, method 600 can further include: determining to free data storage of the computing device; after determining to free data storage, the computing device determining whether the number of applications that use the first version of the second software library is less than a threshold value; and after determining that the number of applications that use the first version of the second software library is less than the threshold value, removing the first version of the second software library from data storage on the computing device, such as discussed above at least in the context of FIGS. 3A and 3B.

In even further of these embodiments, sending the request for one of a full executable and a stripped executable for the software application can include: the computing device determining whether the number of applications that use the first version of the second software library is less than a threshold value; and after determining that the number of applications that use the first version of the second software library is less than the threshold value, sending a request for a full executable for the software application, such as discussed above. In particular of the even further of these embodiments, sending the request for one of a full executable and a stripped executable for the software application can further include: after determining that the number of applications that use the first version of the second software library is not less than the threshold value, sending a request for a stripped executable for the software application, such as discussed above. In other particular of the even further of these embodiments, the threshold number can be one, such as discussed above at least in the context of FIGS. 3A and 3B.

In yet further of these embodiments, method 600 can further include: determining to remove a first software executable that utilizes the first version of the second software library from the computing device; and after determining to remove the first software, the computing device: removing the first software executable, and decrementing the number of applications using the first version of the second software library, such as discussed above at least in the context of FIGS. 3A and 3B. In yet even further of these embodiments, method 600 can further include: receiving a first software package including a second software executable and first package information, the package information including first versioned-shared-library information that includes an identifier for the second software library and the first version of the particular software library; storing the second software executable and first package information on the computing device; and incrementing the number of applications using the first version of the second software library, such as discussed above at least in the context of FIGS. 3A and 3B.

In still even further of these embodiments, each of the plurality of versions of the second software library can have an age; then, method 600 can further include: determining whether an age of a second version of the second software library exceeds a threshold age; and after determining that the age of the second version of the second software library exceeds the threshold age: determining a third software executable that depends upon the second version of the second software library; replacing the third software executable with a fourth software executable that includes the second version of the second software library; and after replacing the third software executable, freeing data storage for the second version of the second software library on the computing device, such as discussed above at least in the context of FIGS. 3A and 3B. In additional further of these embodiments, the computing device is further configured to generate a unique name for each of the plurality of versions of the second software library, such as discussed above.

In particular of these embodiments, matching the queried library version with the stored version of the first software library can include exactly matching the queried library version with the stored version of the first software library, such as discussed above at least in the context of FIGS. 3A and 3B. In other particular of these embodiments, matching the queried library version with the stored version of the first software library can include determining whether the stored version of the software library is at least the requested library version, such as discussed above at least in the context of FIGS. 3A and 3B.

In even other embodiments, method 600 can further include: receiving, at the computing device, versioned-shared-library information for at least a fourth software library used by a second software application, where the versioned-shared-library information for the fourth software library includes an identifier of the fourth software library and a version of the fourth software library, and where the second software application depends on the fourth software library and a fifth software library; after determining that the computing device stores a copy of the fourth software library identified in the versioned-shared-library information by the identifier of the fourth software library and the version of the fourth software library, sending, from the computing device, a request for one of a stripped executable for the second software application, where the stripped executable excludes the fourth software library; and in response to the request, receiving a partially-full executable for the second software application for storing on the computing device, where the partially-full executable for the second software application excludes the fourth software library and includes a copy of the fifth software library, as discussed above.

ADDITIONAL EXAMPLE EMBODIMENTS

The following clauses are offered as further description of the disclosure.

Clause 1—A method, including: receiving, at a computing device, versioned-shared-library information for at least a first software library used by a software application, where the versioned-shared-library information for the first software library includes an identifier of the first software library; determining whether the computing device stores a copy of the first software library identified in the versioned-shared-library information by the identifier of the first software library; based on whether the computing device stores the copy of the first software library, sending, from the computing device, a request for one of a full executable and a stripped executable for the software application, where the full executable includes the first software library, and where the stripped executable excludes the first software library; and in response to the request, receiving the full executable or the stripped executable for the software application for storing on the computing device.

Clause 2—The method of Clause 1, where the versioned-shared-library information for the first software library further comprises a version of the first software library; and the first software library is further identified by the version of the first software library.

Clause 3—The method of Clause 2, where the versioned-shared-library information for the first software library comprises a combined identifier specifying both a name of the first software library and the version of the first software library.

Clause 4—The method of any one of Clauses 1-3, where receiving the full executable or the stripped executable includes receiving the stripped executable, and where the method further includes: loading the stripped executable and the first software library into data storage of the computing device, where the first software library is identified using the identifier of the first software library and the version of the first software library; and after loading the stripped executable and the first software library into data storage, the computing device executing the loaded stripped executable to cause the computing device to perform one or more functions, where at least one function of the one or more functions is performed using software stored in the first software library.

Clause 5—The method of any one of Clauses 1-4, further including: after determining that the computing device does not store a copy of the first software library, locating a copy of the first software library based on the identifier of the first software library and the version of the first software library, and storing the located copy of the first software library on the computing device.

Clause 6—The method of Clause 5, where locating the copy of the first software library includes: sending a request for a copy of the first software library, where the request includes the identifier of the first software library and the version of the first software library, and after sending the request, receiving the copy of the first software library at the computing device.

Clause 7—The method of any one of Clauses 1-6, where the versioned-shared-library information for at least the first software library further includes information related to a hash sum of the first software library.

Clause 8—The method of any one of Clauses 1-7, where the computing device is configured to store a plurality of versions of a second software library identified by identifier and version, where each of the plurality of versions of the second software library share a common identifier, and where each of the plurality of versions of the second software library differs.

Clause 9—The method of Clause 8, where the computing device is configured to store a particular number of versions of the second software library.

Clause 10—The method of Clause 8 or Clause 9, where the computing device is configured to determine a number of applications that use a first version of the second software library.

Clause 11—The method of Clause 10, further including: determining to free data storage of the computing device; after determining to free data storage, the computing device determining whether the number of applications that use the first version of the second software library is less than a threshold value; and after determining that the number of applications that use the first version of the second software library is less than the threshold value, removing the first version of the second software library from data storage on the computing device.

Clause 12—The method of either Clause 10 or Clause 11, where sending the request for one of a full executable and a stripped executable for the software application includes: the computing device determining whether the number of applications that use the first version of the second software library is less than a threshold value; and after determining that the number of applications that use the first version of the second software library is less than the threshold value, sending a request for a full executable for the software application.

Clause 13—The method of either Clause 12, where sending the request for one of a full executable and a stripped executable for the software application further includes: after determining that the number of applications that use the first version of the second software library is not less than the threshold value, sending a request for a stripped executable for the software application.

Clause 14—The method of any one of Clauses 11-13, where the threshold number is one.

Clause 15—The method of any one of Clauses 10-14, further including: determining to remove a first software executable that utilizes the first version of the second software library from the computing device; and after determining to remove the first software, the computing device: removing the first software executable, and decrementing the number of applications using the first version of the second software library.

Clause 16—The method of any one of Clauses 10-15, further including: receiving a first software package including a second software executable and first package information, the package information including first versioned-shared-library information that includes an identifier for the second software library and the first version of the particular software library; storing the second software executable and first package information on the computing device; and incrementing the number of applications using the first version of the second software library.

Clause 17—The method of any one of Clauses 8-16, where each of the plurality of versions of the second software library has an age, and where the method further includes: determining whether an age of a second version of the second software library exceeds a threshold age; and after determining that the age of the second version of the second software library exceeds the threshold age: determining a third software executable that depends upon the second version of the second software library; replacing the third software executable with a fourth software executable that includes the second version of the second software library; and after replacing the third software executable, freeing data storage for the second version of the second software library on the computing device.

Clause 18—The method of any one of Clauses 8-17, where the computing device is further configured to generate a unique name for each of the plurality of versions of the second software library.

Clause 19—The method of any one of Clauses 1-18, where determining whether the computing device stores a copy of the first software library identified by the identifier of the first software library and the version of the first software library includes: receiving a query regarding storage of a software library, the query including a queried library identifier and a queried library version; determining whether the computing device stores a copy of the first software library identified by a stored identifier of the first software library and the stored version of the first software library by at least matching the queried library version with the stored version of the first software library; and after matching the queried library version with the stored version of the first software library, determining that the computing device does store a copy of the first software library.

Clause 20—The method of Clause 19, where matching the queried library version with the stored version of the first software library includes exactly matching the queried library version with the stored version of the first software library.

Clause 21—The method of Clause 19 or Clause 20, where matching the requested library version with the stored version of the first software library includes determining whether the stored version of the software library is at least the queried library version.

Clause 22—The method of any one of claims 1-21, further comprising: receiving, at the computing device, versioned-shared-library information for at least a fourth software library used by a second software application, wherein the versioned-shared-library information for the fourth software library comprises an identifier of the fourth software library and a version of the fourth software library, and wherein the second software application depends on the fourth software library and a fifth software library; after determining that the computing device stores a copy of the fourth software library identified in the versioned-shared-library information by the identifier of the fourth software library and the version of the fourth software library, sending, from the computing device, a request for one of a stripped executable for the second software application, wherein the stripped executable excludes the fourth software library; and in response to the request, receiving a partially-full executable for the second software application for storing on the computing device, wherein the partially-full executable for the second software application excludes the fourth software library and includes a copy of the fifth software library.

Clause 23—A computing device, including: one or more processors; and data storage including at least computer-executable instructions stored thereon that, when executed by the one or more processors, cause the computing device to perform functions including the method of any one of Clauses 1-22.

Clause 24—A computer-readable medium having stored thereon instructions, that when executed by one or more processors of a computing device, cause the computing device to perform functions including the method of any one of Clauses 1-22.

Clause 25—The computer-readable medium of Clause 24, where the computer-readable medium includes a non-transitory computer-readable medium.

Clause 26—An apparatus, including: means for performing the method of any one of Clauses 1-22.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving, at a computing device, versioned-shared-library information for at least a first software library used by a software application, wherein the versioned-shared-library information for the first software library comprises an identifier of the first software library;
determining whether or not the computing device does store a copy of the first software library identified in the versioned-shared-library information by the identifier of the first software library;
after determining whether or not the computing device does store a copy of the first software library, sending a request for an executable for the software application, wherein the request comprises a request for a stripped executable when the computing device does store the copy of the first software library, wherein the request comprises a request for a full executable when the computing device does not store the copy of the first software library, and wherein the full executable comprises an executable for the software application that includes the first software library, and wherein the stripped executable comprises an executable for the software application that excludes the first software library; and in response to the request, receiving the requested executable for the software application for storage on the computing device.

2. The method of claim 1, wherein determining whether or not the computing device does store the copy of the first software library identified in the versioned-shared-library information by the identifier of the first software library comprises determining that the computing device does store the copy of the first software library; wherein sending the request for the executable for the software application comprises sending the request for the stripped executable for the software application from the computing device to a second computing device; and wherein receiving the requested executable for the software application for storage on the computing device comprises receiving the stripped executable at the computing device from the second computing device.

3. The method of claim 1, wherein determining whether or not the computing device stores the copy of the first software library identified in the versioned-shared-library information by the identifier of the first software library comprises determining that the computing device does not store the copy of the first software library;

wherein sending the request for the executable for the software application comprises sending the request for the full executable for the software from the computing device to a second computing device; and wherein receiving the requested executable for the software application for storage on the computing device comprises receiving the full executable at the computing device from the second computing device.

4. The method of claim 1, wherein the versioned-shared-library information for the first software library further comprises a version of the first software library; and the first software library is further identified by the version of the first software library.

5. The method of claim 4, wherein the versioned-shared-library information for the first software library comprises a combined identifier specifying both a name of the first software library and the version of the first software library.

6. The method of claim 1, wherein sending the request for the executable for the software application comprises sending the request for the stripped executable for the software application; and wherein the method further comprises:

loading the stripped executable and the first software library into data storage of the computing device, wherein the first software library is identified using the identifier of the first software library and the version of the first software library; and after loading the stripped executable and the first software library into data storage, the computing device executing the loaded stripped executable to cause the computing device to perform one or more functions, wherein at least one function of the one or more functions is performed using software stored in the first software library.

7. The method of claim 1, further comprising:

after determining that the computing device does not store the copy of the first software library, locating a copy of the first software library based on the identifier of the first software library and a version of the first software library, and storing the located copy of the first software library on the computing device.

8. The method of claim 7, wherein locating the copy of the first software library comprises:

sending a request for the copy of the first software library, where the request comprises the identifier of the first software library and the version of the first software library, and after sending the request for the copy of the first software library, receiving the copy of the first software library at the computing device.

9. The method of claim 1, wherein the versioned-shared-library information for at least the first software library further comprises information related to a hash sum of the first software library.

10. The method of claim 1, wherein the computing device is configured to store a plurality of versions of a second software library identified by identifier and version, wherein each of the plurality of versions of the second software library share a common identifier, wherein each of the plurality of versions of the second software library differs, and wherein the computing device is configured to store a particular number of versions of the second software library.

11. The method of claim 10, wherein the computing device is configured to determine a number of applications that use a first version of the second software library, and wherein the method further comprises:

determining to free data storage of the computing device;

after determining to free data storage, the computing device determining whether the number of applications that use the first version of the second software library is less than a threshold value; and after determining that the number of applications that use the first version of the second software library is less than the threshold value, removing the first version of the second software library from data storage on the computing device.

12. The method of claim 11, wherein sending the request for the executable for the software application comprises:

the computing device determining whether the number of applications that use the first version of the second software library is less than the threshold value; and after determining that the number of applications that use the first version of the second software library is less than the threshold value, sending a request for the full executable for the software application.

13. The method of claim 12, wherein sending the request for the executable for the software application further comprises:

after determining that the number of applications that use the first version of the second software library is not less than the threshold value, sending a request for the stripped executable for the software application.

14. The method of claim 11, further comprising:

determining to remove a first software executable that utilizes the first version of the second software library from the computing device; and after determining to remove the first software executable, the computing device:

removing the first software executable, and decrementing the number of applications using the first version of the second software library.

15. The method of claim 11, further comprising:

receiving a first software package comprising a second software executable and first package information, the first package information comprising first versioned-shared-library information that includes an identifier for the second software library and for the first version of the second software library;

storing the second software executable and first package information on the computing device; and incrementing the number of applications using the first version of the second software library.

16. The method of claim 10, wherein each of the plurality of versions of the second software library has an age, and wherein the method further comprises:

determining whether an age of a second version of the second software library exceeds a threshold age; and after determining that the age of the second version of the second software library exceeds the threshold age:

determining a third software executable that depends upon the second version of the second software library;

replacing the third software executable with a fourth software executable that includes the second version of the second software library; and after replacing the third software executable, freeing data storage for the second version of the second software library on the computing device.

17. The method of claim 10, wherein the computing device is further configured to generate a unique name for each of the plurality of versions of the second software library.

18. The method of claim 1, wherein determining whether or not the computing device does store the copy of the first software library identified by the identifier of the first software library comprises:

receiving a query regarding storage of a software library, the query comprising a queried library identifier and a queried library version;

determining whether or not the computing device does store a copy of the first software library identified by a stored identifier of the first software library and a stored version of the first software library by at least matching the queried library version with the stored version of the first software library; and after matching the queried library version with the stored version of the first software library, determining that the computing device does store a copy of the first software library.

19. The method of claim 18, wherein matching the queried library version with the stored version of the first software library comprises one or more of: exactly matching the queried library version with the stored version of the first software library and determining that the stored version of the software library is at least the queried library version.

20. The method of claim 1, further comprising:

receiving, at the computing device, versioned-shared-library information for at least a fourth software library used by a second software application, wherein the versioned-shared-library information for the fourth software library comprises an identifier of the fourth software library and a version of the fourth software library, and wherein the second software application depends on the fourth software library and a fifth software library;

after determining that the computing device stores a copy of the fourth software library identified in the versioned-shared-library information by the identifier of the fourth software library and the version of the fourth software library, sending, from the computing device, a request for one of a stripped executable for the second software application, wherein the stripped executable excludes the fourth software library; and in response to the request, receiving a partially-full executable for the second software application for storing on the computing device, wherein the partially-full executable for the second software application excludes the fourth software library and includes a copy of the fifth software library.

21. A computing device, comprising:

one or more processors; and data storage including at least computer-executable instructions stored thereon that, when executed by the one or more processors, cause the computing device to perform functions comprising:

receiving versioned-shared-library information for at least a first software library used by a software application, wherein the versioned-shared-library information for the first software library comprises an identifier of the first software library;

determining whether or not the computing device does store a copy of the first software library identified in the versioned-shared-library information by the identifier of the first software library;

after determining whether or not the computing device does store a copy of the first software library, sending a request for an executable for the software application, wherein the request comprises a request for a stripped executable when the computing device does store the copy of the first software library, wherein the request comprises a request for a full executable when the computing device does not store the copy of the first software library, wherein the full executable comprises an executable for the software application that includes the first software library, and wherein the stripped executable comprises an executable for the software application that excludes the first software library; and in response to the request, receiving the requested executable for the software application for storage on the computing device.

22. A non-transitory computer-readable medium having stored thereon instructions, that when executed by one or more processors of a computing device, cause the computing device to perform functions comprising:

receiving versioned-shared-library information for at least a first software library used by a software application, wherein the versioned-shared-library information for the first software library comprises an identifier of the first software library;

determining whether or not the computing device does store a copy of the first software library identified in the versioned-shared-library information by the identifier of the first software library;

after determining whether or not the computing device does store a copy of the first software library, sending a request for an executable for the software application, wherein the request comprises a request for a stripped executable when the computing device does store the copy of the first software library, wherein the request comprises a request for a full executable when the computing device does not store the copy of the first software library, wherein the full executable comprises an executable for the software application that includes the first software library, and wherein the stripped executable comprises an executable for the software application that excludes the first software library; and in response to the request, receiving the requested executable for the software application for storage on the computing device.

* * * * *